(12) United States Patent
Dangui et al.

(10) Patent No.: US 8,094,983 B2
(45) Date of Patent: *Jan. 10, 2012

(54) MULTIPLE-CORE OPTICAL FIBER WITH COUPLINGS BETWEEN THE CORES

(75) Inventors: Vinayak Dangui, Sunnyvale, CA (US); Michel J. F. Digonnet, Palo Alto, CA (US); Gordon S. Kino, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/941,743

(22) Filed: Nov. 8, 2010

(65) Prior Publication Data
US 2011/0142397 A1 Jun. 16, 2011

Related U.S. Application Data

(63) Continuation of application No. 12/435,294, filed on May 4, 2009, now Pat. No. 7,853,107, which is a continuation of application No. 11/681,019, filed on Mar. 1, 2007, now Pat. No. 7,551,819.

(60) Provisional application No. 60/778,229, filed on Mar. 2, 2006.

(51) Int. Cl.
*G02B 6/26* (2006.01)

(52) U.S. Cl. ........ 385/39; 385/15; 385/31; 385/32; 385/33; 385/34; 385/35; 385/36; 385/37; 385/38; 385/50; 385/122; 385/123; 385/124; 385/125; 385/126; 385/127; 385/128

(58) Field of Classification Search .......... 385/15, 385/31–39, 50, 122–128
See application file for complete search history.

(56) References Cited

U.S. PATENT DOCUMENTS

| | | | |
|---|---|---|---|
| 6,301,420 B1 | 10/2001 | Greenaway et al. | |
| 6,654,522 B2 | 11/2003 | Chandalia et al. | |
| 6,826,335 B1 | 11/2004 | Grudinin et al. | |
| 6,829,421 B2 | 12/2004 | Forbes et al. | |
| 6,845,204 B1 * | 1/2005 | Broeng et al. | 385/126 |
| 6,847,771 B2 * | 1/2005 | Fajardo et al. | 385/125 |

(Continued)

FOREIGN PATENT DOCUMENTS

CN 1687808 A 10/2005

OTHER PUBLICATIONS

Bergh, R.A. et al., Single-mode fibre optic directional coupler, Electronics Letters, vol. 16, pp. 260-261, 1980.

(Continued)

*Primary Examiner* — Brian M. Healy
*Assistant Examiner* — Guy Anderson
(74) *Attorney, Agent, or Firm* — Knobbe, Martens, Olson & Bear LLP

(57) ABSTRACT

An optical fiber includes a cladding, a first core, and a second core. At least one of the first core and the second core is hollow and is substantially surrounded by the cladding. At least a portion of the first core is generally parallel to and spaced from at least a portion of the second core. The optical fiber includes a defect substantially surrounded by the cladding, the defect increasing a coupling coefficient between the first core and the second core.

23 Claims, 27 Drawing Sheets

U.S. PATENT DOCUMENTS

| | | | |
|---|---|---|---|
| 6,891,992 B2 * | 5/2005 | Kopp et al. | 385/24 |
| 7,082,242 B2 | 7/2006 | Fajardo et al. | |
| 7,106,932 B2 * | 9/2006 | Birks et al. | 385/123 |
| 7,110,650 B2 | 9/2006 | Kim et al. | |
| 7,190,875 B2 | 3/2007 | Anderson et al. | |
| 7,228,041 B2 | 6/2007 | Kim et al. | |
| 7,321,712 B2 * | 1/2008 | Williams et al. | 385/125 |
| 7,343,074 B1 * | 3/2008 | Gallagher et al. | 385/125 |
| 7,349,611 B2 * | 3/2008 | Broeng et al. | 385/125 |
| 7,532,798 B2 * | 5/2009 | Williams et al. | 385/125 |
| 7,567,740 B2 * | 7/2009 | Bayindir et al. | 385/101 |
| 7,853,107 B2 * | 12/2010 | Dangui et al. | 385/125 |
| 2002/0131713 A1 | 9/2002 | Peng et al. | |
| 2004/0061863 A1 | 4/2004 | Digonnet | |
| 2004/0161199 A1 * | 8/2004 | Oh et al. | 385/43 |
| 2006/0193592 A1 | 8/2006 | McNie et al. | |
| 2009/0263090 A1 * | 10/2009 | Dangui et al. | 385/126 |

OTHER PUBLICATIONS

Broeng, J. et al., Photonic crystal fibers: A new class of optical waveguides, Optical Fiber Technology 5, 305-330, 1999, Article ID ofte. 1998.0279, available online at http:www.idealibrary.com.

Buczynski, R. et al., Double-core photonic crystal fiber with square lattice, Proceedings of the SPIE—The International Society for Optical Engineering SPIE—Int. Soc. Opt. Eng. USA, vol. 5450, No. 1, 2004, pp. 223-230, XP002439214.

Chremmos, I.D. et al., Modeling of highly nonlinear chalcogenide dual-core photonic crystal fiber coupler, Optics Communications, North-Holland Publishing Co., Amsterdam, NL, vol. 251, No. 4-6, Jul. 15, 2005, pp. 339-345, XP004953514 ISSN: 0030-4018.

de Matos, C.J.S. et al., All-fiber chirped pulse amplification using highly-dispersive air-core photonic bandgap fiber, Optics Express, pp. 2832-2837, Nov. 3, 2003, vol. 11, No. 22.

Digonnet, Michel J.F. et al., Simple geometric criterion to predict the existence of surface modes in air-core photonic-bandgap fibers, Optics Express, pp. 1864-1872, May 3, 2004, vol. 12, No. 9.

Examination Report for EP 07752249.8 dated Jul. 12, 2010.

Examination Report for EP 07752249.8 dated Dec. 22, 2009.

Examination Report for EP 07752249.8 dated Dec. 7, 2009.

Kim, Hyang Kyun et al., Designing air-core photonic-bandgap fibers free of surface modes, IEEE Journal of Quantum Electronics, vol. 40, No. 5, May 2004, pp. 551-556.

International Preliminary Report on Patentability in International Application No. PCT/US2007/005535 issued Sep. 2, 2008.

International Search Report and Written Opinion for PCT/US2007/005535, mailed Jul. 5, 2007.

Laegsgaard, J. et al., Photonic crystal fiber design for broadband directional coupling, Optics Letters Opt. Soc. American USA, vol. 29, No. 21, Nov. 1, 2004, pp. 2473-2475, XP002439213 ISSN: 0149-9592.

Padden, W.E.P. et al., Coupling in a twin-core microstructure polymer optical fiber, Applied Physical Letters, AIP, American Institute of Physics, Melville, NY, US, Mar. 8, 2004, pp. 1689-1691, XP012060713 ISSN: 0003-6951.

Saitoh, K. et al., Coupling characteristics of dual-core photonic crystal fiber couplers, Optics Express, Opt. Soc. America USA, vol. 11, No. 24, Dec. 1, 2003, pp. 3188-319, XP002439215 ISSN: 1094-4087.

Schiffner, G. et al., Double-core single-mode optical fiber as directional coupler, Applied Physics, Springer Verlag, Heidelberg, DE, vol. 23, No. 1, Sep. 1980, pp. 41-45, XP008076519.

Wright, J.V., Variational analysis of fused tapered couplers, Electronics Letters, vol. 21, pp. 1064-1065, 1985.

* cited by examiner

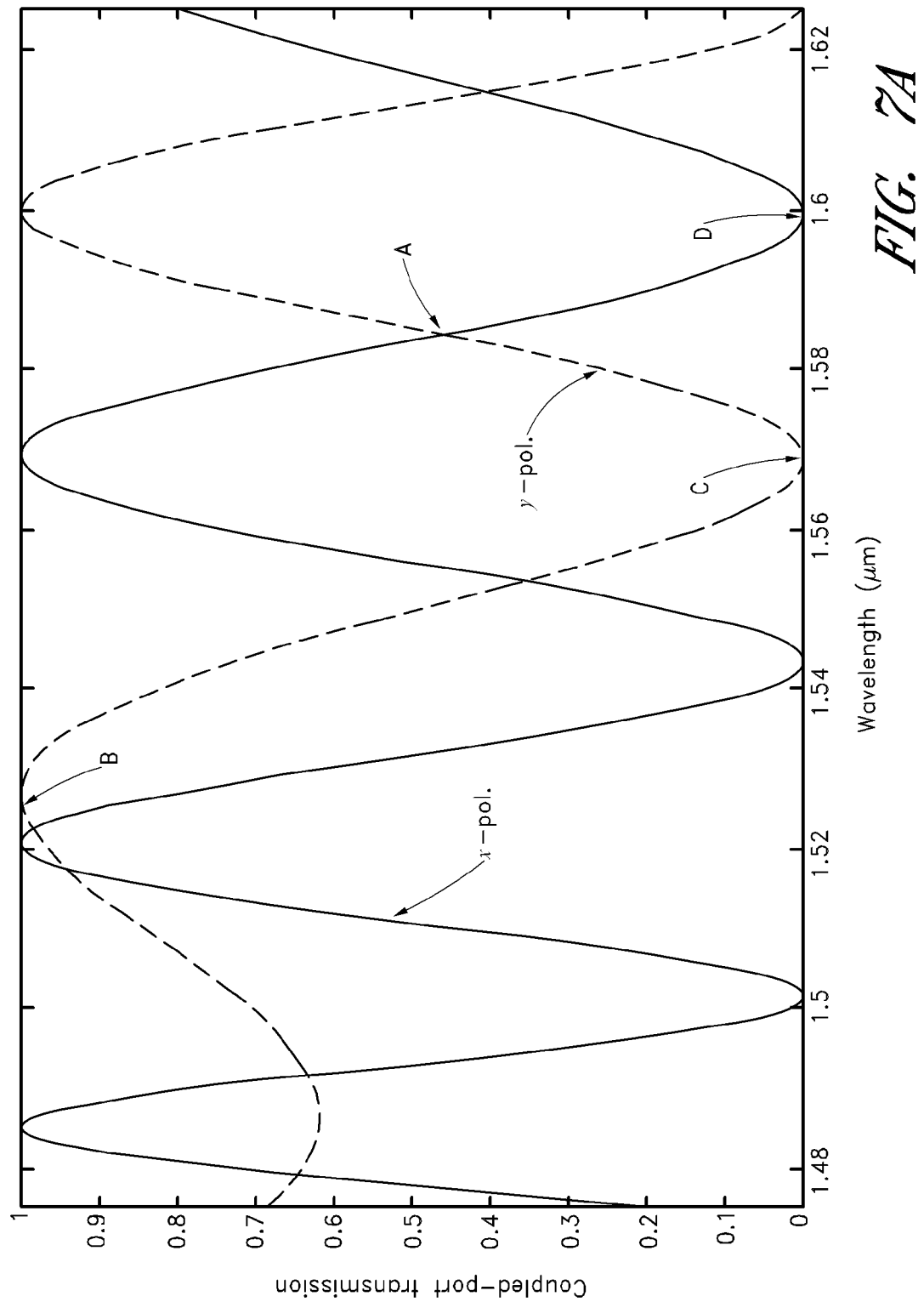

MULTIPLE-CORE OPTICAL FIBER WITH COUPLINGS BETWEEN THE CORES

CLAIM OF PRIORITY

This application is a continuation from U.S. patent application Ser. No. 12/435,294, filed May 4, 2009 and incorporated in its entirety by references herein, which is a continuation from U.S. patent application Ser. No. 11/681,019, filed Mar. 1, 2007 and incorporated in its entirety by reference herein, and which claims the benefit of U.S. Provisional Pat. Appl. No. 60/778,229, filed Mar. 2, 2006, which is incorporated in its entirety by reference herein.

BACKGROUND

1. Field of the Invention

This application relates generally to optical devices utilizing photonic-bandgap fibers.

2. Description of the Related Art

Photonic-crystal fibers have been the subject of much interest and developments in recent years. (See, e.g., J. Broeng et al., "*Photonic crystal fibers: A new class of optical waveguides,*" Optical Fiber Technology, Vol. 5, pages 305-330 (1999); J. C. Knight et al., "*Photonic crystals as optical fibers physics and applications,*" Optical Materials, Vol. 11, pages 143-151 (1999); R. S. Windeler et al., "*Silica-air microstructured fibers: Properties and applications,*" Optical Fiber Communications conference, San Diego, Calif. (1999).) Because of their unique properties, including low optical nonlinearities and good temperature stability, hollow-core photonic-bandgap fibers (PBFs) are finding interesting applications as sensors and delivery systems. (See, e.g., V. Dangui et al., "*Phase sensitivity to temperature of the fundamental mode in air-guiding photonic-bandgap fibers,*" Optics Express, Vol. 13, pages 6669-6684 (2005); H. K. Kim et al., "*Fiber-optic gyroscope using an air-core photonic-bandgap fiber,*" Proceeding of SPIE—The International Society for Optical Engineering, 17th International Conference on Optical Fibre Sensor, OFS-17, Vol. 5855, pages 198-200 (2003).) In addition, the propagation loss in hollow-core PBFs is not limited by the core material, and it is expected that the propagation loss can be exceedingly low. The hollow core can be filled with air, or other gases or combinations of gases to generate the desired light-matter interaction. With further research and improvements, hollow-core PBFs could well replace conventional fibers in optical communication links.

One of the most important components of fiber circuits for these applications is the optical fiber coupler. Fiber circuits utilizing hollow-core PBFs can be readily assembled using conventional (i.e., solid-core) fiber couplers, which can be either butt-coupled or spliced to the hollow-core PBF. However, this approach suffers from various shortcomings. Butt-coupled junctions often do not provide sufficient mechanical stability, and splices of dissimilar fibers can introduce significant amount of back-reflection and associated loss, as well as being somewhat difficult to fabricate. In addition, the use of a conventional fiber coupler introduces a length of solid-core fiber in the hollow-core fiber circuit, thereby re-introducing dispersion and nonlinearity into the fiber circuit and negating some of the benefits of using the hollow-core PBFs.

Examples of applications in which these effects can be detrimental include, but are not limited to, delivery by a hollow-core PBF of pulse-distortion-free high-peak-power pulses for fluorescence imaging (see, e.g., T. P. Hansen et al., "*All-fiber chirped pulse amplification using highly-dispersive air-core photonic bandgap fiber,*" Optics Express, Vol., 11, pages 2832-2837 (2003)) and in hollow-core PBF gyroscopes (see, e.g., R. A. Bergh et al., "*Single-mode Fibre Optic Directional Coupler,*" Electronics Letters, Vol. 16, pages 260-261 (1980); J. V. Wright, "*Variational Analysis of Fused Tapered Couplers,*" Electronics Letters, Vol. 21, pages 1064-1065 (1985).), where the Kerr effect is advantageously minimized and additional lengths of solid-core fibers are to be avoided.

SUMMARY

In certain embodiments, an optical coupler is provided. The optical coupler comprises a first optical port, a second optical port, a third optical port, and a fourth optical port. The optical coupler further comprises a photonic-bandgap fiber comprises a cladding, a first core, and a second core. The cladding comprises a material with a first refractive index and regions within the cladding. The regions have a second refractive index lower than the first refractive index. The first core is substantially surrounded by the cladding. The first core is optically coupled to the first optical port and to the second optical port. The second core is substantially surrounded by the cladding. The second core is optically coupled to the third optical port and to the fourth optical port. At least a portion of the first core is generally parallel to and spaced from at least a portion of the second core such that the first core is optically coupled to the second core. The first core, the second core, or both the first core and the second core is hollow.

In certain embodiments, a method for using a photonic-bandgap fiber is provided. The method comprises providing a photonic-bandgap fiber comprising a cladding, a first core, and a second core. The cladding comprises a material with a first refractive index and regions within the cladding. The regions have a second refractive index lower than the first refractive index. The first core is substantially surrounded by the cladding. The second core is substantially surrounded by the cladding. The first core is spaced from the second core such that the first core is optically coupled to the second core. The method further comprises coupling light between the first core and the second core.

BRIEF DESCRIPTION OF THE DRAWINGS

FIG. 7A illustrates the coupling ratios for x- and y-polarization for an example two-core PBF with a crystal period Λ=2.6 microns, a bandgap centered around 1.55 microns, d=3Λ=7.8 microns, and a length L=10.5 millimeters.

DETAILED DESCRIPTION

Figure 1A:
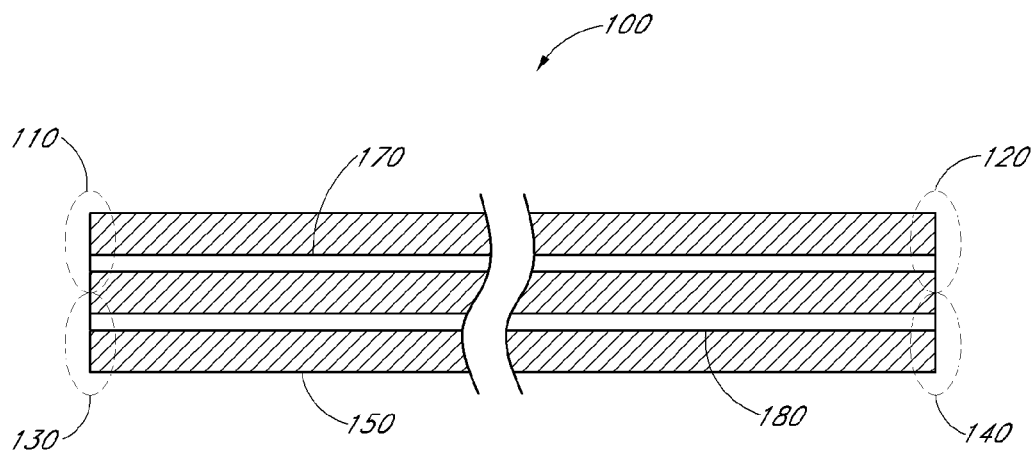
FIG. 1A schematically illustrates an example optical coupler in accordance with certain embodiments described herein.

FIG. 1A schematically illustrates an example optical coupler 100 in accordance with certain embodiments described herein. The optical coupler 100 comprises a first optical port 110, a second optical port 120, a third optical port 130, and a fourth optical port 140. The optical coupler 100 further comprises a two-core photonic-bandgap fiber (PBF) 150 comprising a cladding 160, a first core 170, and a second core 180. The first core 170 is optically coupled to the first optical port 110 and to the second optical port 120. The second core 180 is optically coupled to the third optical port 130 and to the fourth optical port 140. In certain embodiments, the first optical port 110 comprises a first portion of the first core 170, and the second optical port 120 comprises a second portion of the first core 170. In certain embodiments, the third optical port 130 comprises a first portion of the second core 180, and the fourth optical port 140 comprises a second portion of the second core 180. Persons skilled in the art can identify appropriate means or techniques for splicing or butt-coupling the two-core PBF to other portions of an optical system in accordance with certain embodiments described herein.

Figure 1B:
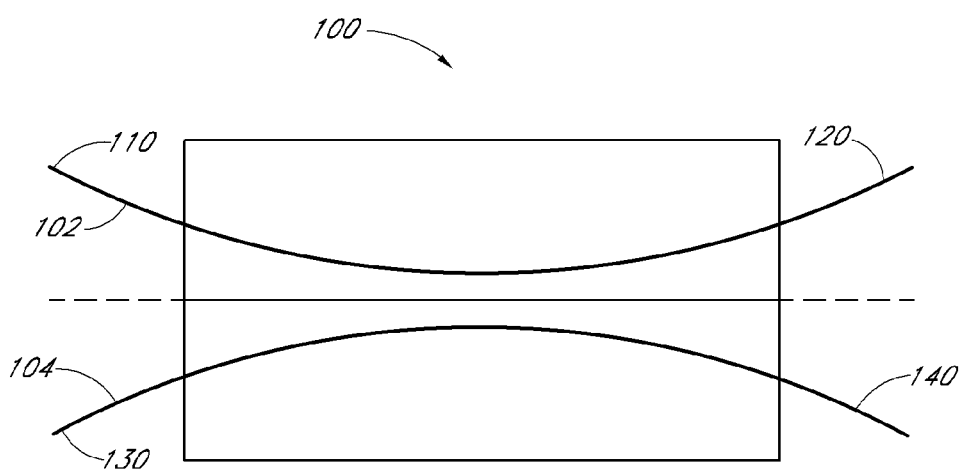
FIG. 1B schematically illustrates an example fiber coupler formed by side polishing two hollow-core photonic-bandgap fibers mounted on silica blocks.

Two hollow-core photonic-bandgap fibers (PBFs) can be coupled to each other by using the same technologies developed for coupling solid-core fibers. For example, as described more fully below, in certain embodiments, a two-core PBF coupler can be fabricated with two hollow cores, each of which is substantially surrounded by a cladding. In certain other embodiments, other technologies can be used to fabricate a hollow two-core PBF coupler, including but not limited to, side-by-side coupling of polished hollow-core PBFs, fusing of two hollow-core PBFs together, and utilizing micro-optic beam splitters. FIG. 1B schematically illustrates an example fiber coupler 100 formed by side polishing two hollow-core PBFs 102, 104 mounted on silica blocks. Micropositioners can be used to position both hollow-core PBFs 102, 104 together, and by controlling the distance and/or angle of the PBFs 102, 104, a tunable device can be fabricated.

Figure 1C:
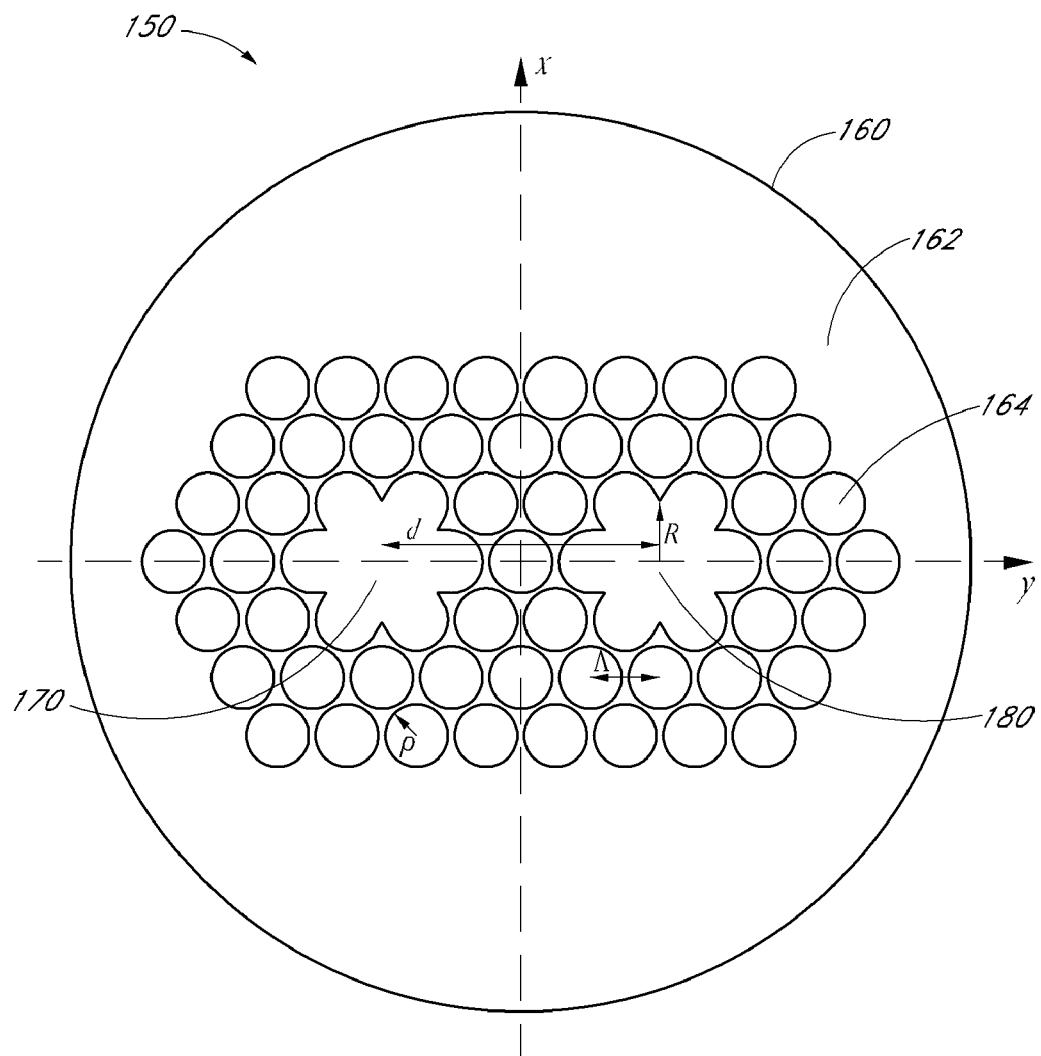
FIG. 1C schematically illustrates a cross-sectional view of an example two-core photonic-bandgap fiber (PBF) in accordance with certain embodiments described herein.

FIG. 1C schematically illustrates a cross-sectional view of the two-core PBF 150 in a plane generally perpendicular to a longitudinal axis of the two-core PBF 150. The cladding 160 comprises a material 162 with a first refractive index and regions 164 within the cladding 160. The regions 164 have a second refractive index lower than the first refractive index. FIG. 1B does not show all of the regions 164. In certain embodiments, the first core 170 and the second core 180 are substantially identical to one another (e.g., twin-core PBF).

In certain embodiments, the material 162 comprises silica, while in certain other embodiments, the material 162 comprises another solid material or a multiplicity of solid materials (e.g., high-index glasses such as chalcogenides, or polymers such as PMMA). In certain embodiments, at least one or both of the first core 170 and the second core 180 is hollow. In certain embodiments, the regions 164 are hollow. As used herein, the term "hollow" is used in its broadest sense, including being empty or filled with a gaseous material. For example, the first core 170, the second core 180, and the regions 164 of certain embodiments are filled with a gaseous second material (e.g., air), which can be at atmospheric pressure, at higher pressures, or at lower pressures (e.g., at vacuum).

Various shapes and patterns of the regions 164 of the cladding 160 are compatible with certain embodiments described herein. The regions 164 can have circular cross-sections (with radius ρ), as schematically illustrated by FIG. 1B, but other shapes of these regions 164 (e.g., elliptical, hexagonal, non-geometrical, or non-symmetric) are also compatible with certain embodiments described herein. As schematically illustrated by FIG. 1B, the regions 164 each have a respective center and adjacent regions 164 are spaced apart by a center-to-center distance Λ. In certain embodiments, the regions 164 of the cladding 160 are cylindrical extending along the longitudinal axis of the two-core PBF 150. In certain embodiments, the regions 164 are generally identical to one another and are in a periodic, triangular pattern. In addition, the regions 164 can be in other patterns (e.g., hexagonal patterns, square patterns, non-periodic patterns, etc.).

In certain embodiments, one or both of the cores 170, 180 has a circular cross-section (with a radius R), as schematically illustrated by FIG. 1B. However, other cross-sectional shapes for the first core 170 and the second core 180 are also compatible with certain embodiments described herein. In certain embodiments, the first core 170 and the second core 180 each have a respective center, and the centers are separated along a lattice vector of the regions 164 of the cladding 160. In certain such embodiments in which the cores 170, 180 are centered on two regions 164, the core-to-core separation d is a multiple of the crystal spatial period Λ, i.e., d=mΛ, where m is an integer. In certain such embodiments, the integer m is even, while in certain other embodiments, the integer m is odd.

The first and second refractive indices are selected in certain embodiments such that each of the cores 170, 180 supports a guided mode via the photonic-bandgap effect. This implies that the second refractive index of the regions 164 is lower than the first refractive index of the material 162, and that the difference between these indices is large enough to support guided modes. In certain embodiments, neither of the cores 170, 180 comprises a core ring, while in certain other embodiments, one or both of the first core 170 and the second core 180 comprises a core ring.

Coupling between the first core 170 and the second core 180 can generally be described by either coupled-mode or normal-mode theory. In coupled-mode theory, when light is launched into the fundamental mode of the first core 170, the evanescent field of the light extends into the adjacent second core 180 and excites the fundamental mode of the second core 180, which results in the energy of the light gradually transferring into the second core 180.

In normal-mode theory, the structure is viewed as a two-core waveguide, which supports four non-degenerate eigenmodes: an even (or symmetric) mode and an odd (or antisymmetric) mode for each of the two orthogonal linear polarizations. When light of a given polarization is launched into one of the cores 170, 180, it excites the even and odd modes of this polarization with almost equal power. Because these two non-degenerate modes have different phase velocities, as they propagate along the fiber, they accumulate a phase shift. After a certain length, called the coupling length or beat length, this phase shift reaches $\pi$ radians, so the two modes are out of phase from one another, and they interfere destructively in the original core and constructively in the other core. Thus, at the beat length, the energy of the light has been coupled from one core to the other core. It can be shown that the beat length is proportional to the reciprocal of the effective index mismatch between the even modes and the odd modes.

To model the coupling properties of the two-core PBF structure, a numerical simulator can be used to calculate the effective indices of the two fundamental eigenmodes supported by the two cores 170, 180. Such numerical simulations, performed using the Stanford Photonic-Bandgap Fiber (SPBF) code, are described more fully below. The numerical simulations used a finite-difference method to solve a vectorial transverse-magnetic-field equation in a matrix form to quickly and accurately calculate the effective index, electric fields, and magnetic fields of the four fundamental eigenmodes of a fiber of arbitrary index profile. (See, e.g., V. Dangui et al., "*A fast and accurate numerical tool to model the mode properties of photonic-bandgap fibers,*" Optical Fiber Conference Technical Digest, Anaheim, Calif. (2005).) Only one quadrant of the two-core PBF structure was modeled, and the fields in the other quadrants were reconstructed by symmetry. The code's boundary conditions imposed that all fields are zero outside of the simulation area. The code was run with a step size of $\Lambda/50$ and a window size (for one quadrant) of $11\Lambda \times 11\Lambda$ (10 rows of cladding regions plus an outer cladding of solid silica about $\Lambda/2$ thick). On a 3.2-GHz personal computer, the calculations took about 20 minutes to model 80 modes (core, surface, and cladding modes) of the two-core PBF structure schematically illustrated by FIG. 1B at a particular wavelength.

For a triangular cladding lattice, the modes of a single-core PBF have the symmetries of the point group $C_{6v}$. However, twin-core fiber structures have two axes of symmetry: one along a line joining both core centers, (termed the y-axis), and the other along a line orthogonal to the line joining both core centers (termed the x-axis) and formed by the points equidistant from both core centers. Consequently, the modes of a two-core PBF belong to the $C_{2v}$ point group, and all their modes can be classified in one of four representations, defined as:

Representation A1: x-polarized, odd mode;
Representation A2: y-polarized, odd mode;
Representation B1: x-polarized, even mode; and
Representation B2: y-polarized, even mode.

The four fundamental core modes of the two-core PBF fiber 150 can be calculated across the bandgap, and the coupling lengths between the odd and even modes for each polarization can be determined by the effective index differences between the corresponding representations:

$$L_{C,x}(\lambda) = \frac{\lambda}{2|n_{eff,A1}(\lambda) - n_{eff,B1}(\lambda)|} \text{ and } L_{C,y}(\lambda) = \frac{\lambda}{2|n_{eff,A2}(\lambda) - n_{eff,B2}(\lambda)|}. \quad \text{Eq. (1)}$$

An example embodiment of a two-core PBF 150 was modeled using a core radius R=0.8$\Lambda$, a hole radius $\rho$=0.47$\Lambda$ of the regions 164 and core separations d ranging from $\Lambda$ to 6$\Lambda$ in increments of $\Lambda$. This core radius R corresponds to a structure in which each isolated core 170, 180 is free of surface modes (see, e.g., U.S. Pat. No. 7,110,650, U.S. Patent Application Publication No. 2005/0281522A1, and H. K. Kim et al., "*Designing air-core photonic-bandgap fibers free of surface modes,*" IEEE J. Quant. Electron., Vol. 40, pages 551-556 (2004), each of which is incorporated in its entirety by reference herein). The calculated dispersion curves of all the core modes that fall within the bandgap, highlighted according to their symmetry class, are plotted in FIG. 2 for a core separation of d=3$\Lambda$. This two-core PBF exhibits a bandgap that extends from 0.56$\Lambda$ to 0.64$\Lambda$, which are identical to the bandgap for a single-core PBF. Neither the first core 170 nor the second core 180 of the two-core PBF supports surface modes, thereby retaining the surface mode-free properties of the single core structure resulting from the proper choice of core radius, as predicted by the existence criterion presented by M. J. F. Digonnet et al., "*Simple geometric criterion to predict the existence of surface modes in air-core photonic-bandgap fibers,*" Optics Express, Vol. 12, pages 1864-1872 (2004).

Figure 2:
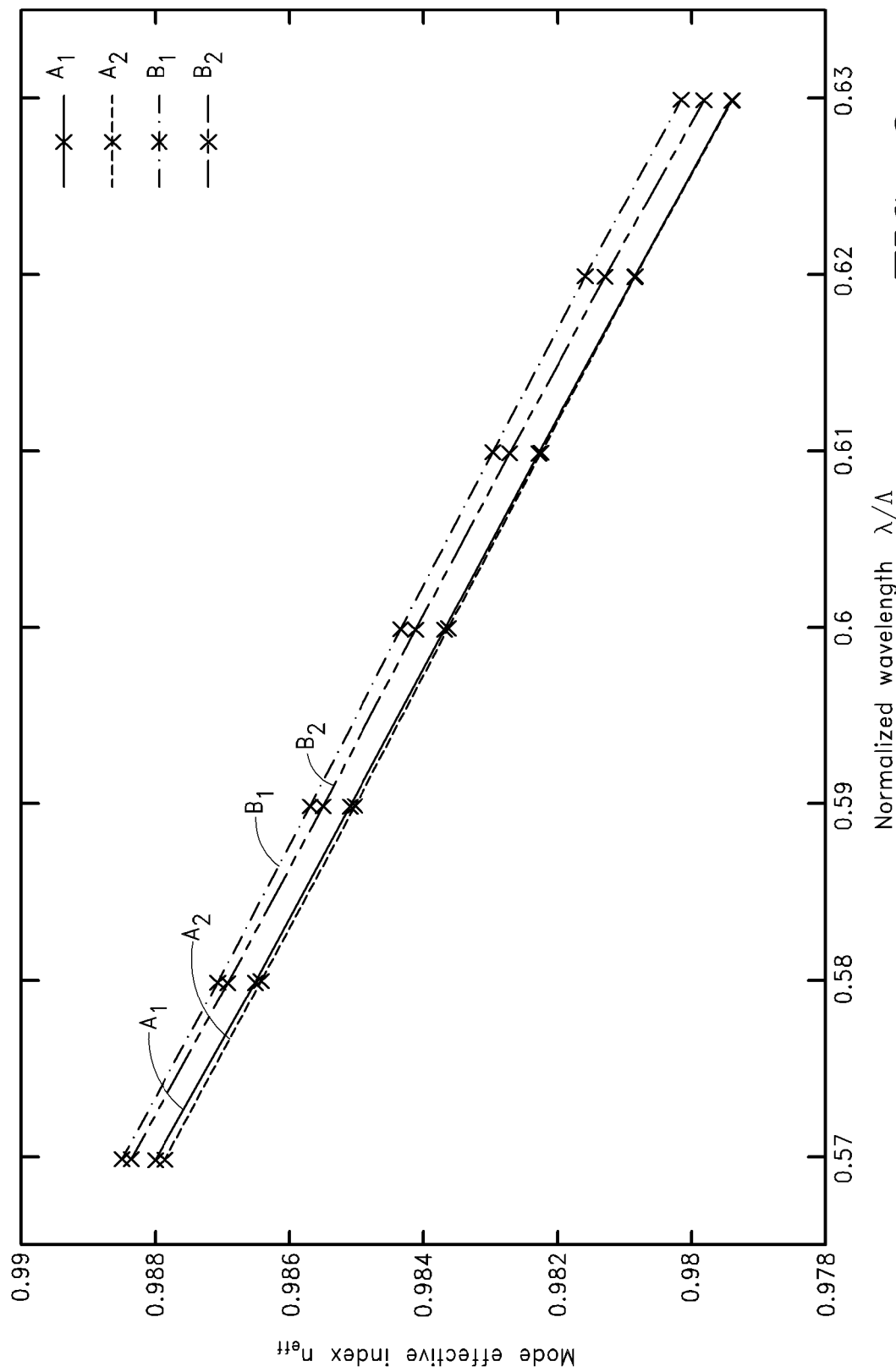
FIG. 2 illustrates dispersion curves of the four fundamental modes of an example two-core PBF structure with R=0.8Λ, ρ=0.47Λ, and d=3Λ.

As illustrated by FIG. 2, both polarizations exhibit a significant birefringence between the odd and even modes. For example, at a wavelength of $\lambda$=0.6$\Lambda$, the index difference $\Delta n$ is approximately $6 \times 10^{-4}$ for the x-polarization and $4 \times 10^{-4}$ for the y-polarization. The even modes have a higher effective index than do the odd modes (for this core spacing d=3$\Lambda$), similar to the situation prevailing in solid-core fibers (where even modes have a slower phase velocity than do odd modes). For a typical crystal period of $\Lambda$=2.5 microns, the coupling lengths calculated from these index differences are $L_{c,x}$=1.2 millimeters and $L_{c,y}$=1.9 millimeters.

These values are comparable to the coupling lengths of conventional index-guiding two-core fibers with similar core spacings. This result is somewhat surprising since the cladding field of the fundamental mode is much weaker in an air-core fiber than in a conventional single-mode fiber, so the coupling length was consequently expected to be substantially longer. The direct consequence of this result is that full coupling can be achieved between the cores of a two-core PBF over lengths of the order of one millimeter (e.g., a coupling length in a range between approximately 1 millimeter and approximately 1.9 centimeters), which means that optical couplers of practical lengths can be fabricated in hollow-core fibers.

Another property of the two-core PBF illustrated by FIG. 2 is that coupling can depend rather strongly on polarization. This feature is not generally desirable in certain embodiments in which the polarization of the incoming signal has a generally unknown and time-dependent state of polarization. However, a side benefit of this strong dependence is that two-core PBFs can be used as wavelength-dependent and polarization-dependent filters, as discussed more fully below.

FIGS. 3A-3H illustrates the calculated intensity profiles of the four fundamental modes of the two-core PBF (d=3Λ) at λ=0.6Λ. Each representation is quasi-gaussian in the neighborhood of a core center, and it exhibits small side lobes localized on the thicker regions of the cladding material (e.g., silica) closest to each core. The main lobes have the same sign for the two even modes, and opposite signs for the two odd modes. For d=3Λ, λ=0.6Λ, and Λ=2.5 microns, the coupling length for x-polarized light is about 1.18 millimeters and for y-polarized light is about 1.59 millimeters.

Both the x-polarized and y-polarized even modes exhibit some energy localized around the mid-point between the cores. This property is shown in FIGS. 3C and 3G, but is more readily seen in the logarithmic scale plots of FIGS. 3D and 3H. The closest opposite sidelobes, for both cores, are shown to be linked together in FIGS. 3D and 3H, resulting in a stronger effective index for the even modes, and decreased coupling length. This property results from the presence of a solid membrane at the mid-point, which is surrounded by hollow regions on both sides and thus constitutes a local index-guided waveguide.

Figure 3A:
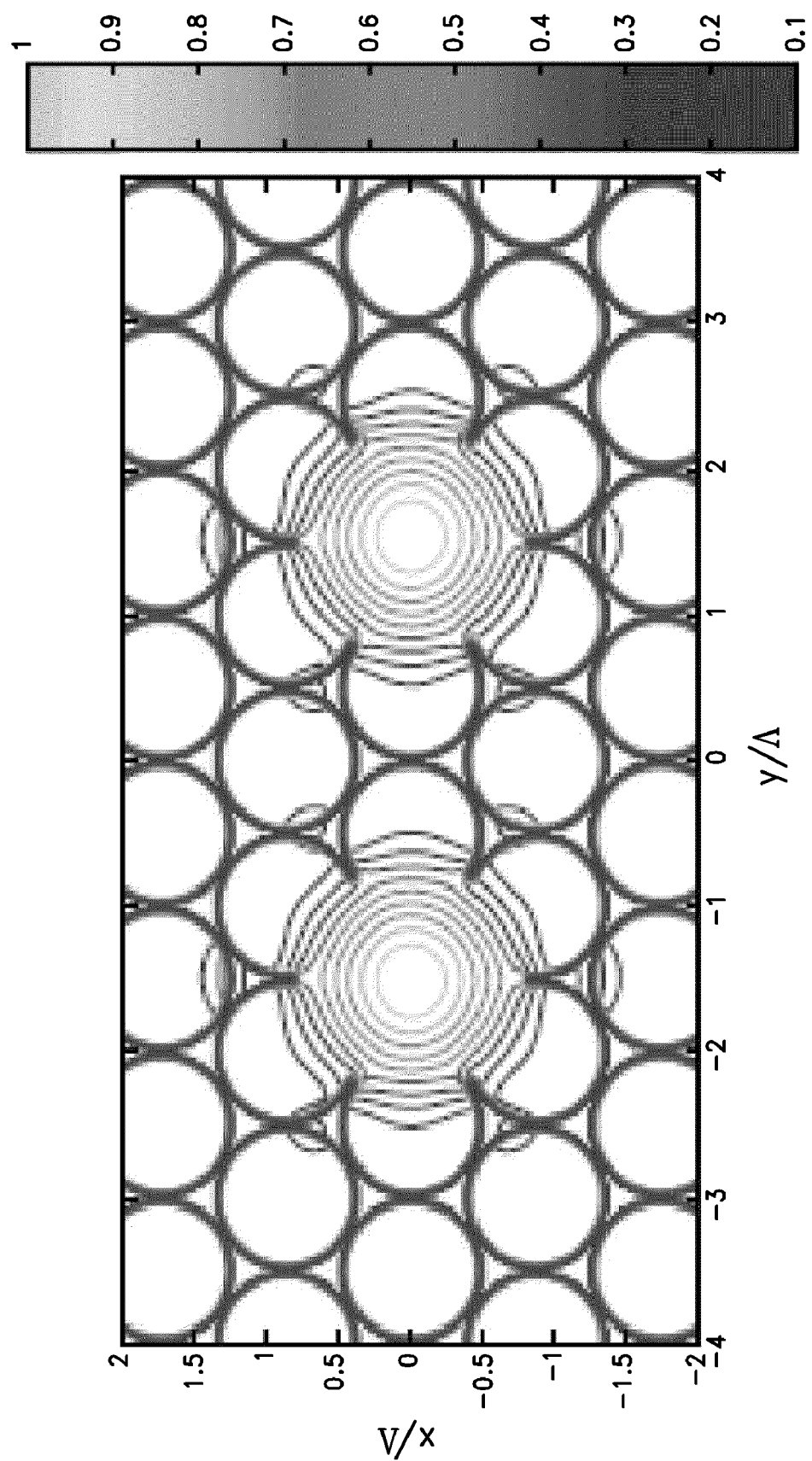
FIGS. 3A-3B illustrate contour and logarithmic scale plots, respectively, of the odd mode, x-polarized intensity profile of the two-core PBF (d=3Λ) at λ=0.6Λ.
Figure 3B:
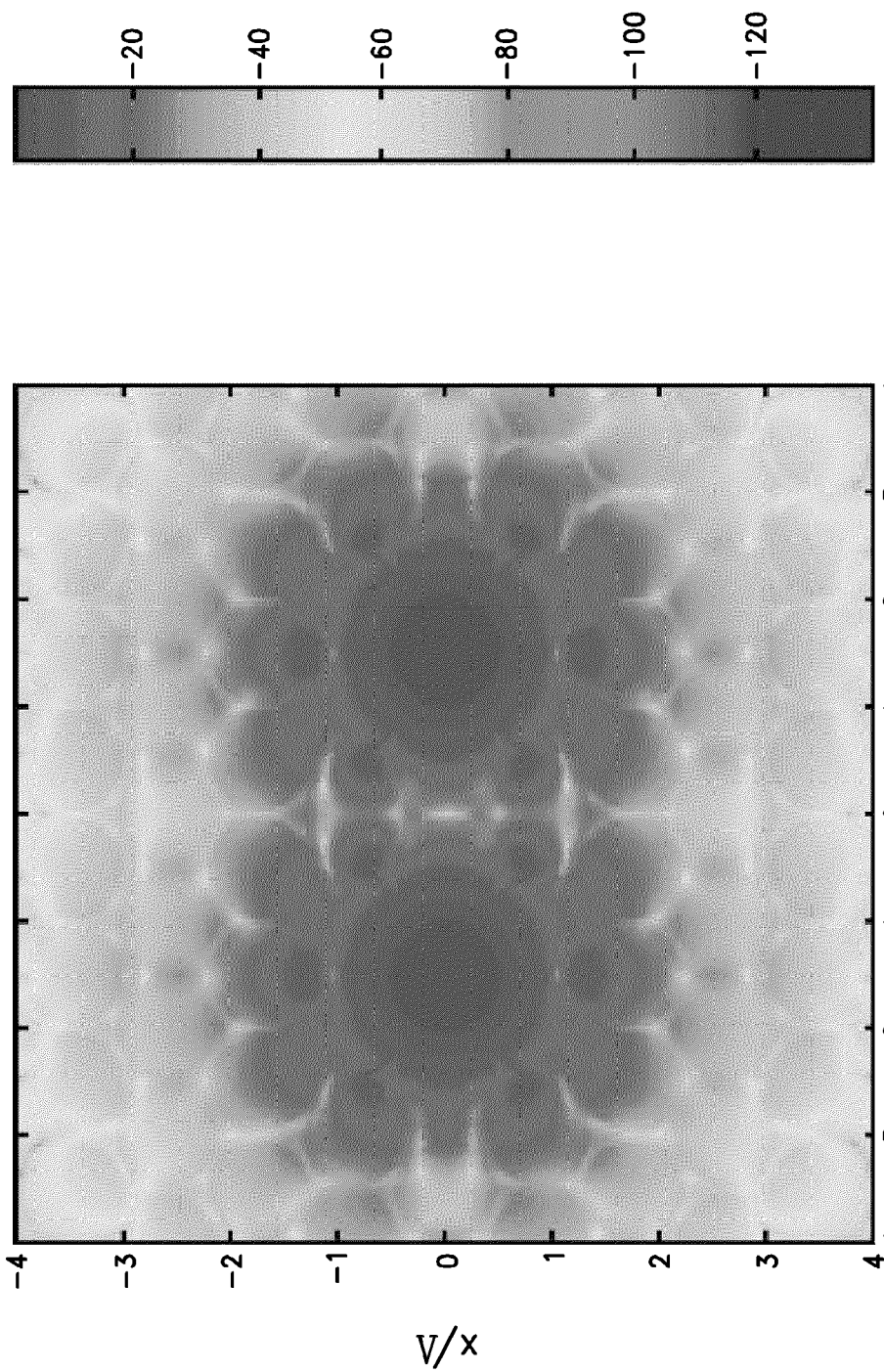
Figure 3C:
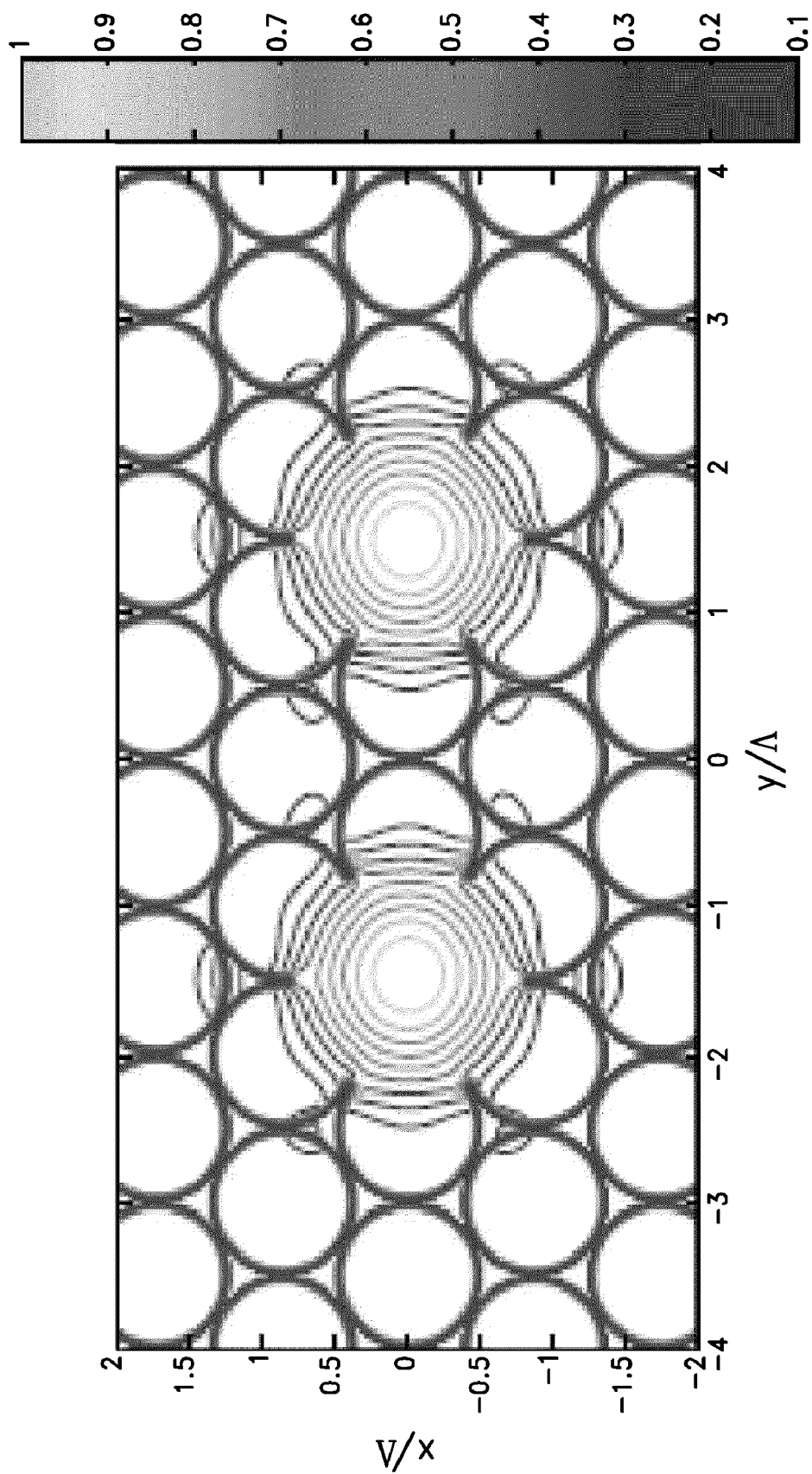
FIGS. 3C-3D illustrate contour and logarithmic scale plots, respectively, of the even mode, x-polarized intensity profile of the two-core PBF (d=3Λ) at λ=0.6Λ.
Figure 3D:
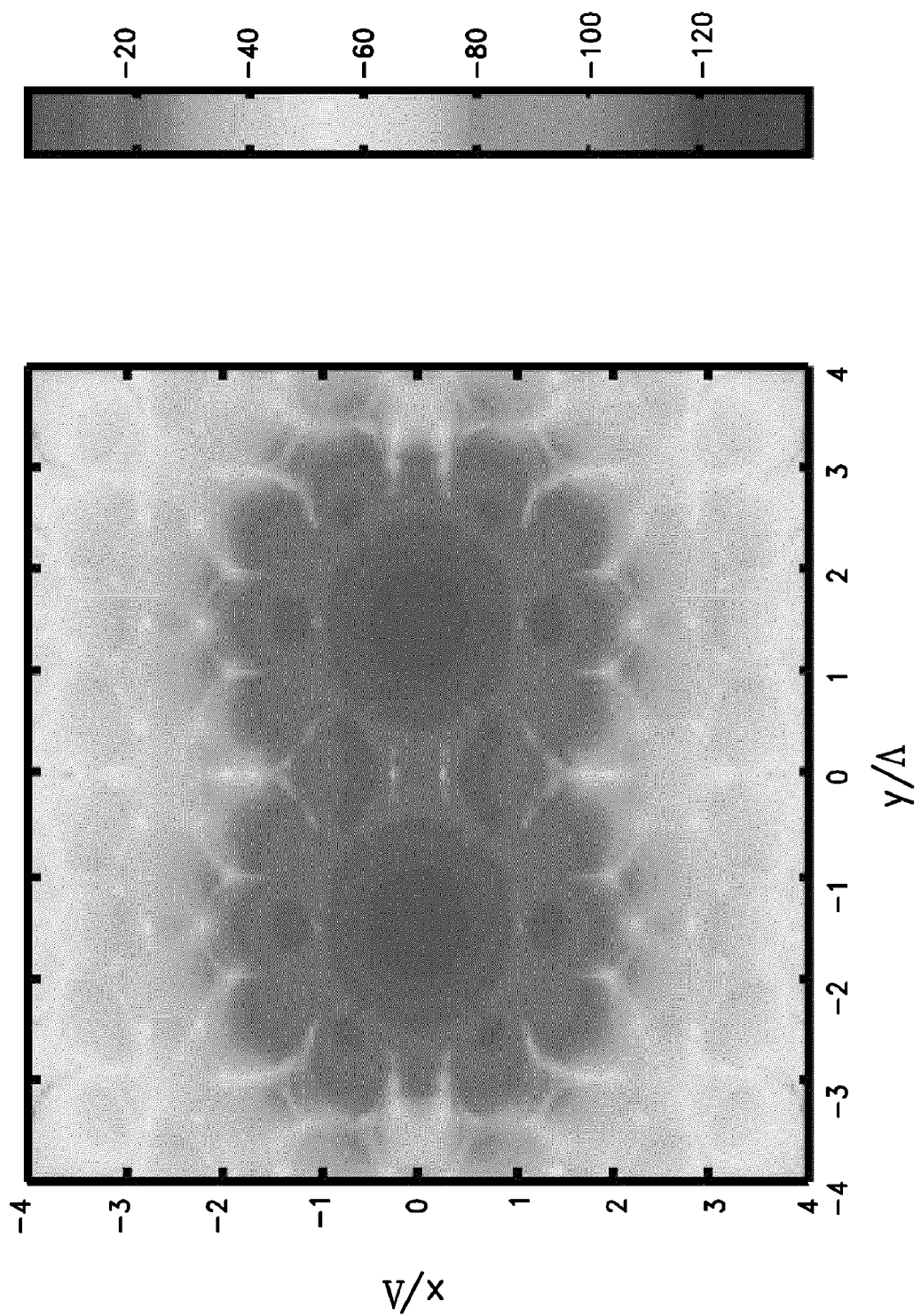
Figure 3E:
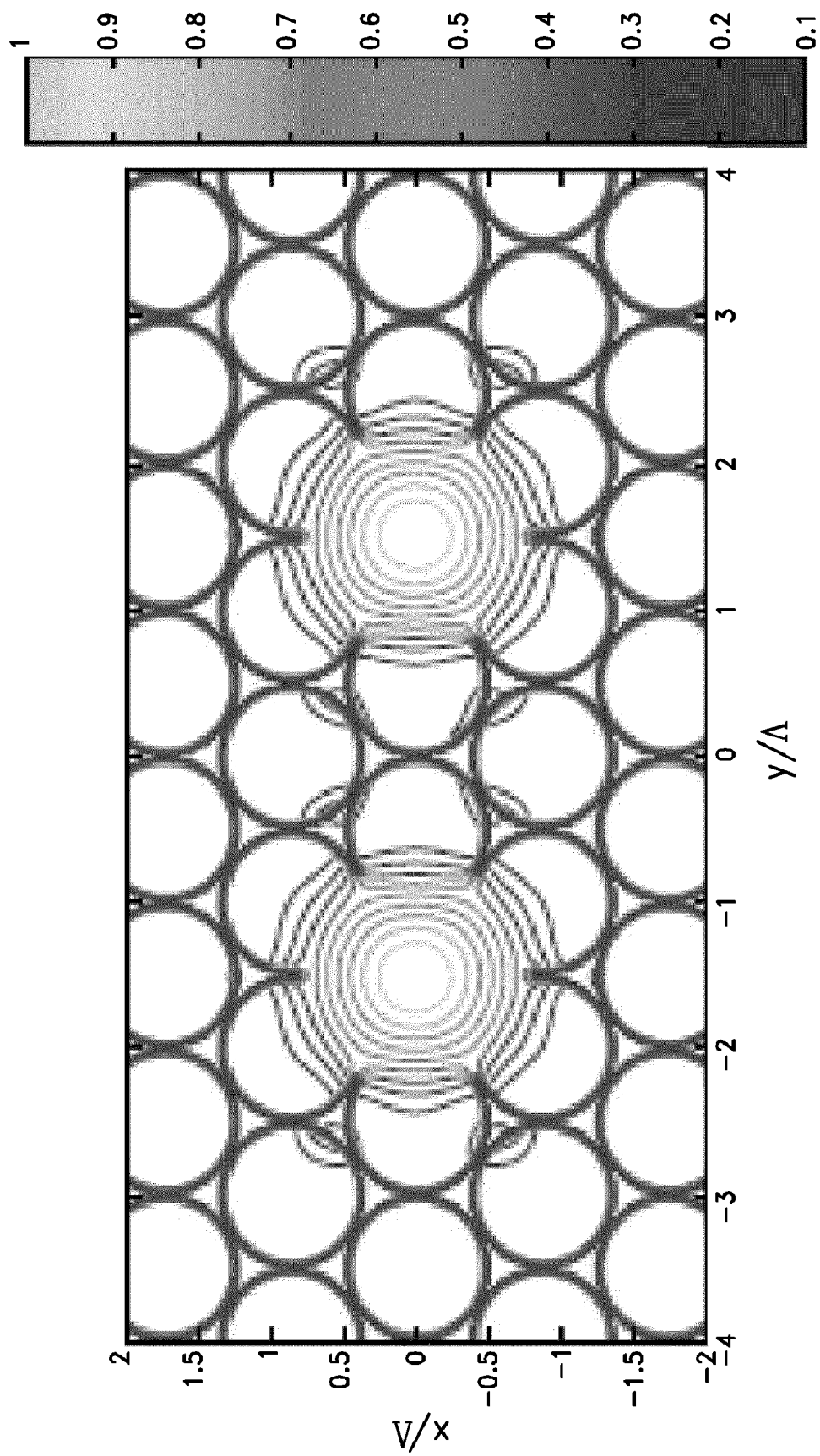
FIGS. 3E-3F illustrate contour and logarithmic scale plots, respectively, of the odd mode, y-polarized intensity profile of the two-core PBF (d=3Λ) at λ=0.6Λ.
Figure 3F:
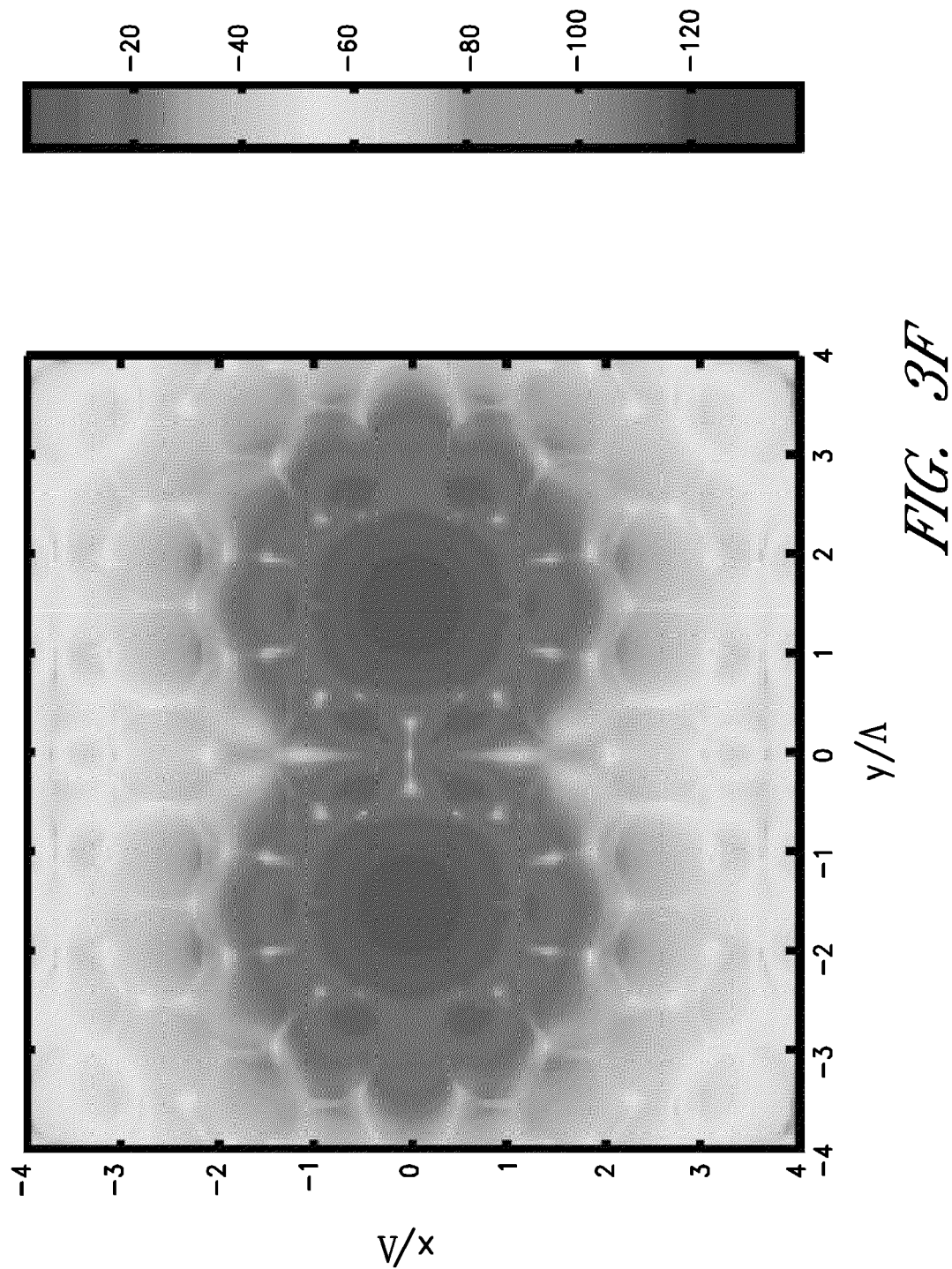
Figure 3G:
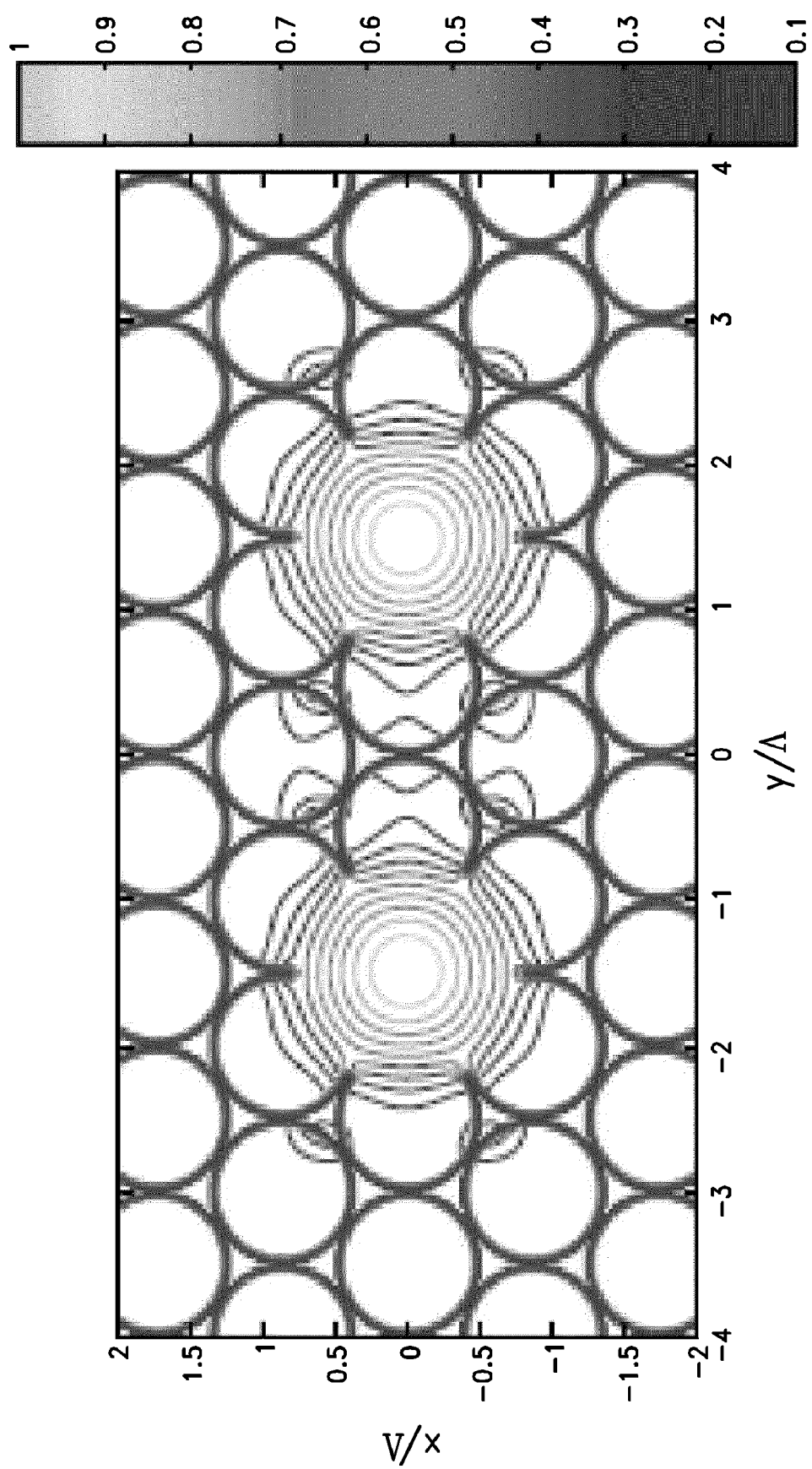
FIGS. 3G-3H illustrate contour and logarithmic scale plots, respectively, of the even mode, y-polarized intensity profile of the two-core PBF (d=3Λ) at λ=0.6Λ.}
Figure 3H:
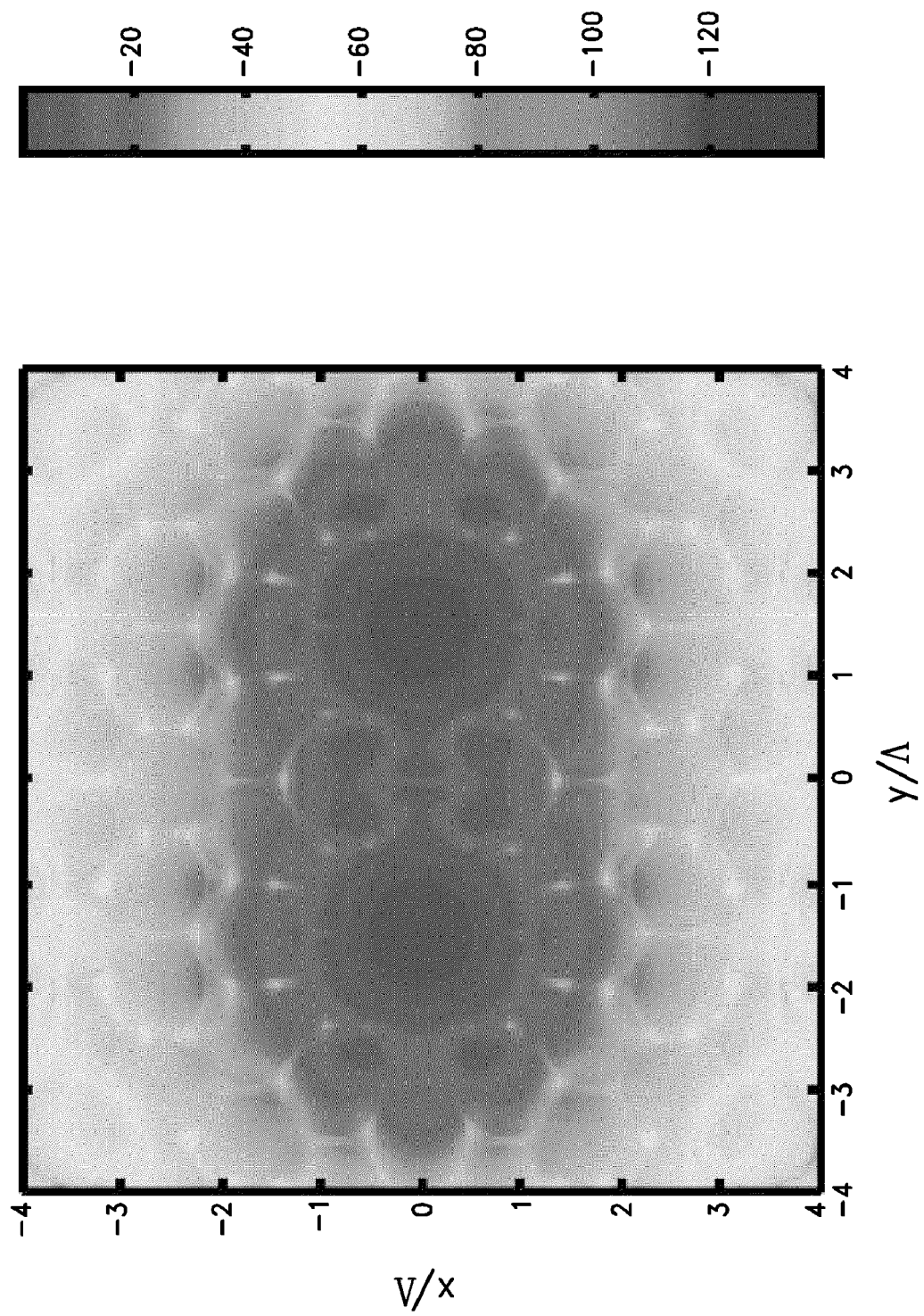
Figure 4A:
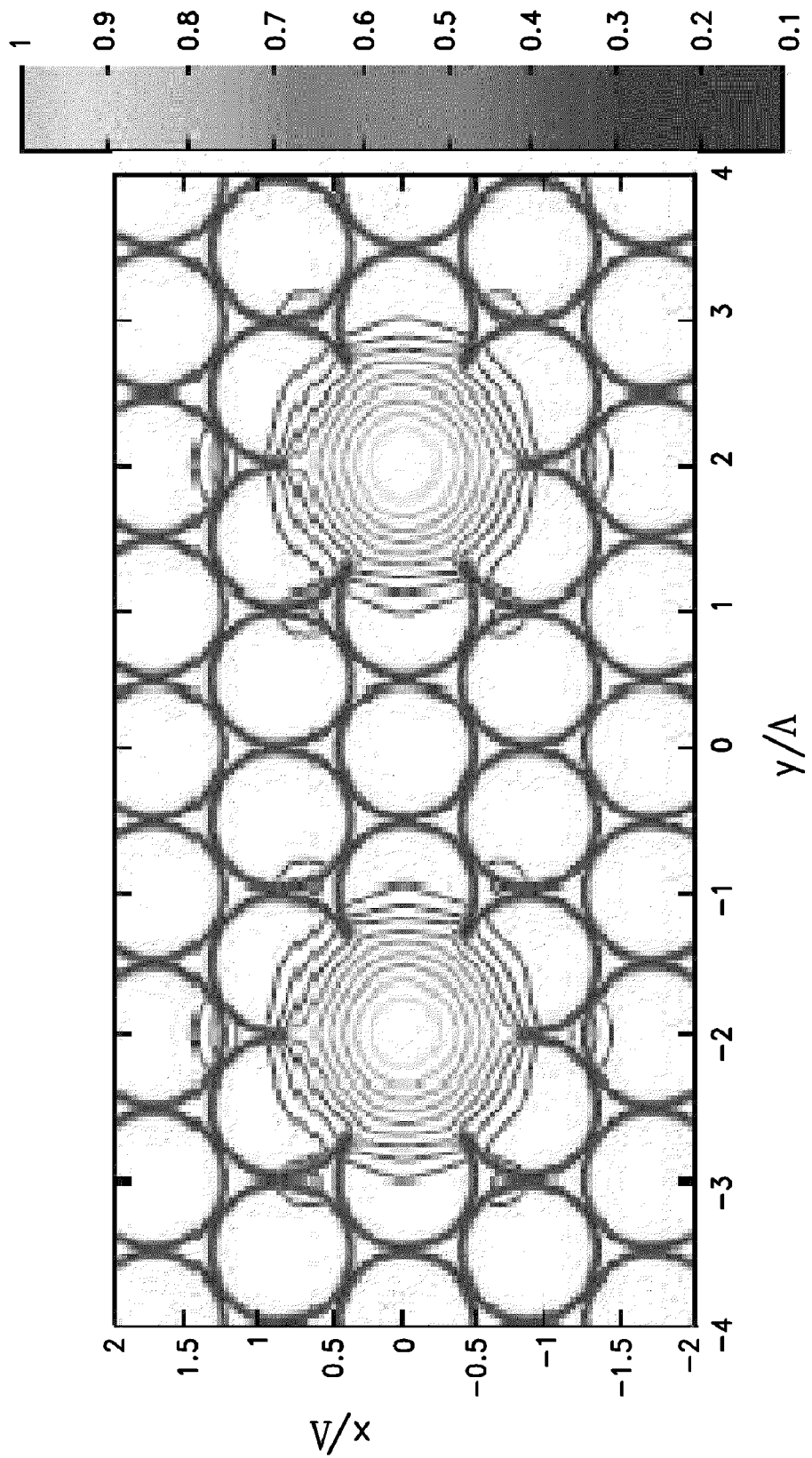
FIGS. 4A-4D illustrate the contour intensity profiles of the (i) odd, x-polarized, (ii) even, x-polarized, (iii) odd, y-polarized, and (iv) even, y-polarized modes for d=4Λ at λ=0.6Λ, respectively.
Figure 4B:
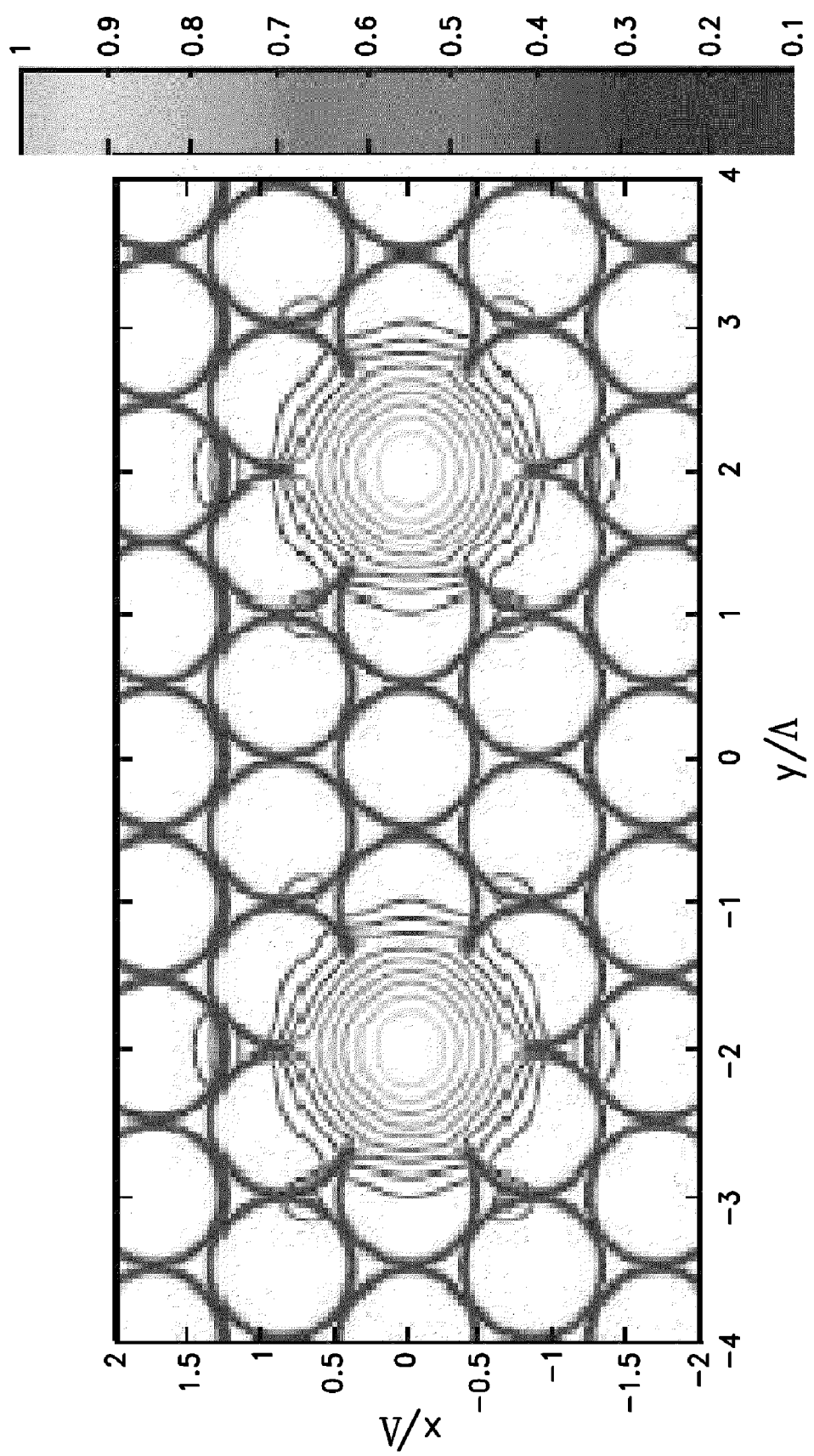
Figure 4C:
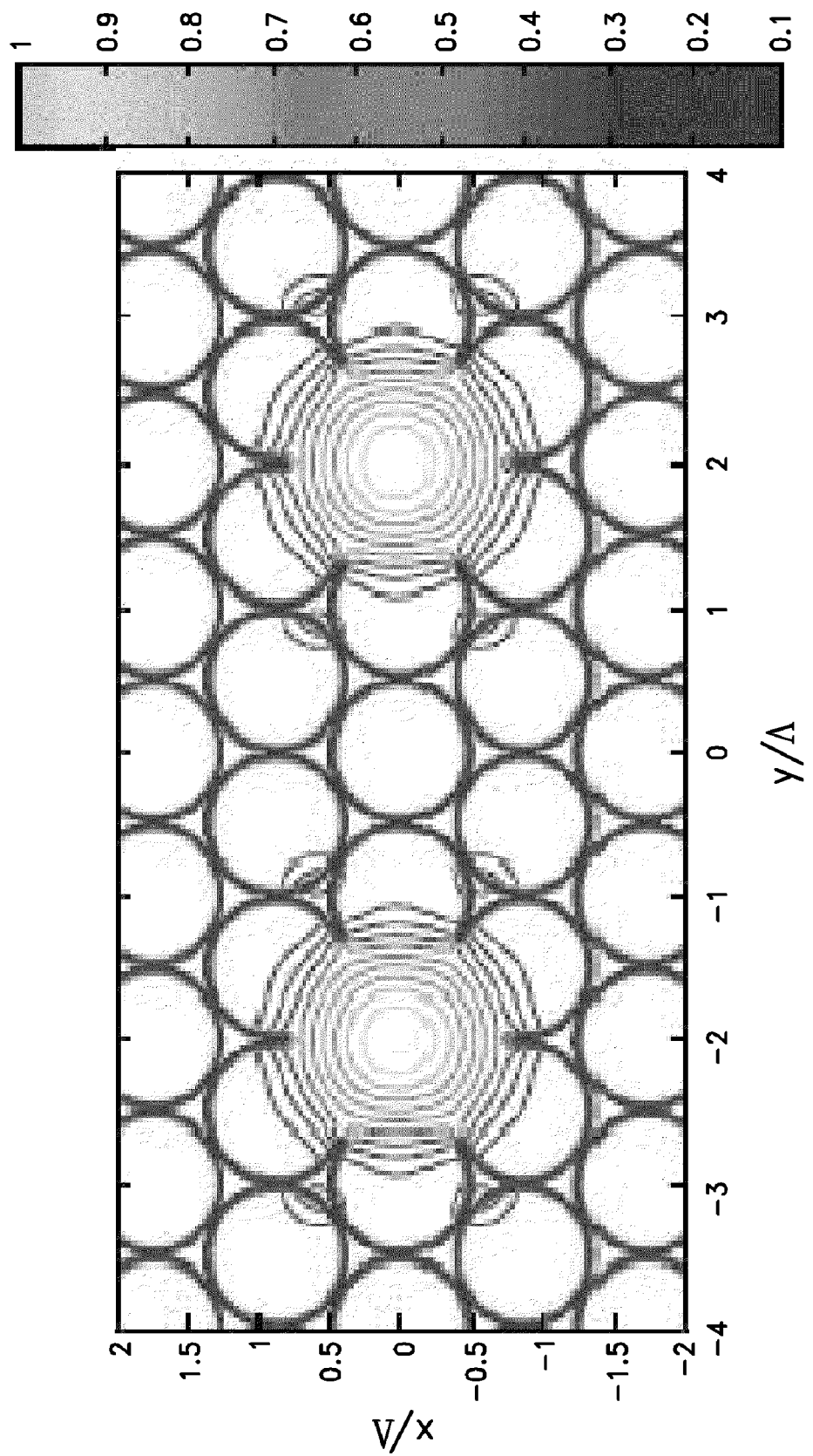
Figure 4D:
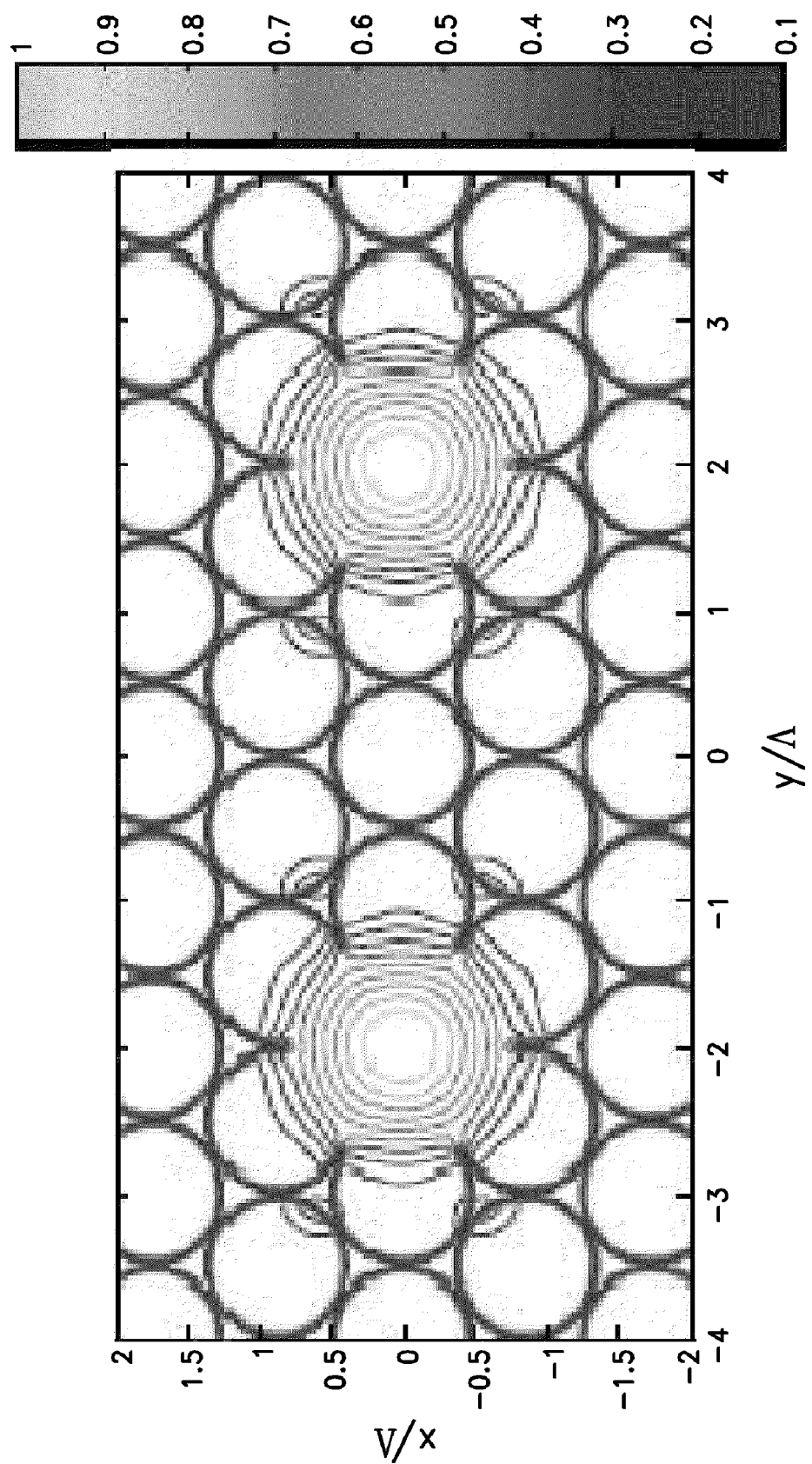

In contrast, the odd modes carry virtually no energy at the mid-point between the cores, as shown in FIGS. 3A and 3E. Therefore, the even modes have a larger amount of energy in the solid membrane, which raises their effective index relative to the odd modes. This phenomenon is at the origin of the surprisingly large predicted coupling: the presence of the solid membrane at the mid-point between the cores raises the effective index of the even modes relative to the odd modes, and it does so by a substantial amount because of the large index difference between the hollow regions and the solid material (e.g., silica). This phenomenon also explains why the even modes of this two-core PBF (d=3Λ) have a higher effective index than do the odd modes.

Figure 5:
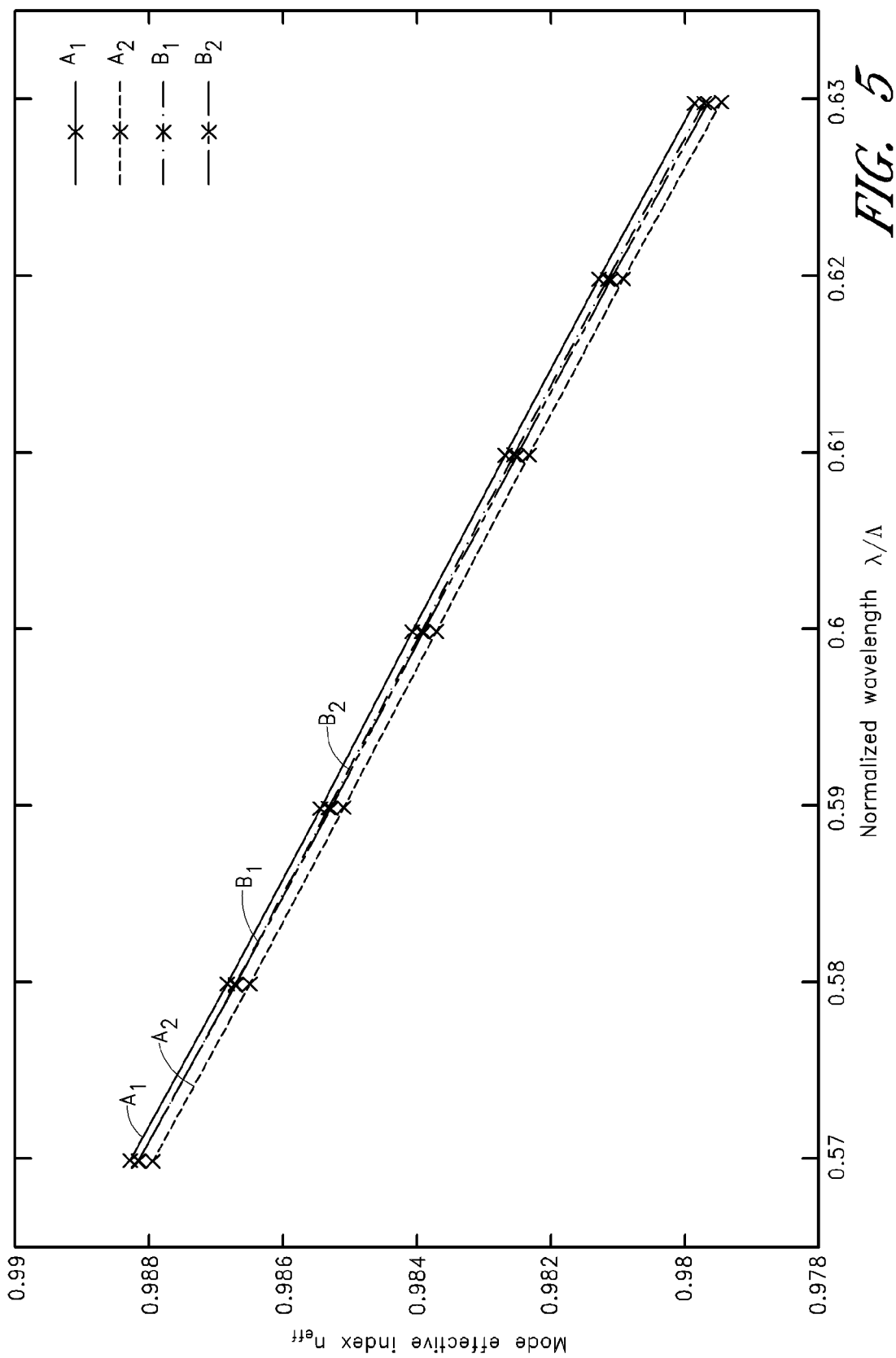
FIG. 5 illustrates the dispersion curves of the four fundamental modes of another example two-core PBF structure with R=0.8Λ, ρ=0.4Λ, and d=4Λ.

Based on this physical explanation, the coupling strength can be considerably smaller when there is a hollow region rather than a solid membrane at the center of the fiber. This configuration can be accomplished by changing the core spacing from an odd to an even multiple of Λ. FIGS. 4A-4D illustrate the contour intensity profiles of the four fundamental modes of the same two-core PBF and at the same wavelength, but for d=4Λ. The mid-point between both cores is now located at the center of a hollow region of the cladding, and the differences between the intensity profiles of the odd and even modes are much less pronounced. The dispersion curves of the four modes are therefore much closer to each other than they are for a spacing of d=3Λ, as shown in FIG. 5. The high-index mid-point solid membrane has been replaced by a lower index material (e.g., air), and the birefringence of all modes is noticeably reduced. For d=4Λ, for the x-polarization, the relative position of the dispersion curves for the odd and even modes is reversed from what it is for d=3Λ, as shown by a comparison of FIGS. 2 and 5. The order of the dispersion curves of the odd and even modes remains unchanged for the y-polarization by changing from d=3Λ to d=4Λ.

The polarization dependence of the coupling length in a two-core PBF is a feature not present in conventional two-core fibers. In the latter, due to the azimuthal invariance of the refractive index profile, the fields of the two orthogonally polarized fundamental modes differ only very slightly under a 90-degree rotation. Hence, the mode overlap from one fiber core to the other depends extremely weakly on polarization. This behavior can be seen mathematically in the expression of the coupling coefficient κ defined as $\kappa = \pi/(2 L_C)$, and is given by:

$$\kappa = \omega\varepsilon_0 \frac{\iint_{core1} n^2(x,y) \vec{E}_1 \cdot \vec{E}_2^* dxdy}{\iint_{coupler} u_z \cdot (\vec{E}_1^* \times \vec{H}_1 + \vec{E}_1 \times \vec{H}_1^*) dxdy} \qquad \text{Eq. (2)}$$

where $\vec{E}_1$ and $\vec{H}_1$ are the fields of the fundamental mode for the first core and $\vec{E}_2$ and $\vec{H}_2$ are the fields of the fundamental mode for the second core. In a single-mode solid-core fiber, both solutions for the orthogonal polarizations are deduced from each other through a 90-degree rotation, so both the numerator and the denominator of Equation (2) are polarization-independent. This results in the coupling coefficient κ being essentially independent of polarization. In contrast, in a two-core PBF, the fundamental modes belong to a two-dimensional representation and are not invariant under a 90-degree rotation. The field distribution of one polarization mode cannot be derived from the distribution of the other polarization mode through a simple rotation, and the field overlap integral in the numerator of Equation (2) is polarization-dependent.

Figure 6:
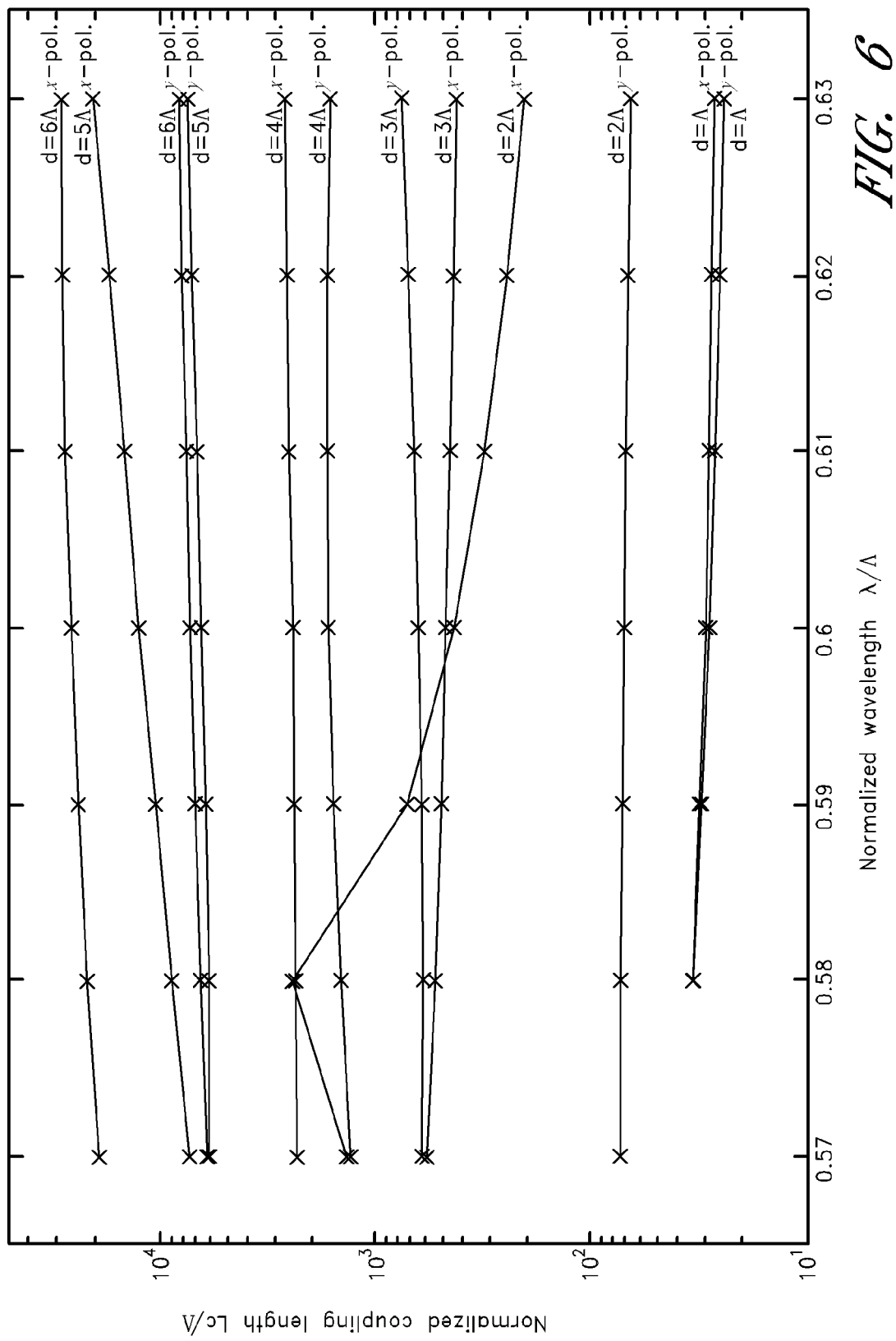
FIG. 6 illustrates the normalized coupling length $L_C/\Lambda$ as a function of wavelength for an example two-core PBF with R=0.8Λ, ρ=0.47Λ, and d varying from Λ to 6Λ.

FIG. 6 illustrates the normalized coupling length $L_C/\Lambda$ calculated against the normalized wavelength $\lambda/\Lambda$ for both the x- and y-polarizations and increasing values of the core separation. The coupling length increases rapidly (e.g., approximately exponentially) as the core separation increases, because the mode energy decreases rapidly away from the center of a given core. The coupling length is found to increase roughly by a factor of 3 to 5 for every increase in d of Λ. For example, at 0.6λ/Λ, for x-polarization, $L_c$ increases from 1.2 millimeters for d=3Λ to 5.5 millimeters for d=4λ. This rate is consistent with the fundamental core mode field intensity spatial attenuation in a single-core PBF of similar parameters. The polarization dependence of the coupling length is again significant, even for larger core separations. For a separation of one period (d=Λ), the two cores strongly overlap with each other and form a single, roughly "8"-shaped core elongated along the y-axis, which explains the reduced polarization dependence. The anomalous behavior for d=2Λ is also believed to be caused by overlap between the cores. For d=3Λ, which is the shortest possible separation along the y-axis without core overlap, the wavelength dependence is relatively strong. Across the bandgap, the coupling length varies by about a factor of about 4.

Two-core PBFs also exhibit different modal behavior than conventional two-core fibers. In typical fiber coupler structures made with index-guiding fibers, the even mode exhibits a higher effective index than does the odd mode. In contrast, due to the presence of either a hollow region or a solid material at the middle point between both fiber cores (depending on the core separation d), the parity of d/Λ determines the modal behavior of the two-core PBF structures. For even values of d/Λ, the middle point between the two cores is at a hollow region, and for odd values of d/Λ, the middle point between the two cores is located in the solid cladding material. Depending on the parity of d/Λ, the relative positions of the odd and even fundamental core modes of the two-core PBF structure are exchanged, as shown in FIGS. 2 and 5. For odd values of d/Λ, the even fundamental mode has a higher effective index than does the odd mode, regardless of polarization, as in the case of a conventional index-guiding two-core fiber. However, for even values of d/Λ, the odd fundamental mode has a higher effective index than the even mode for the x-polarization, while that behavior is opposite for the y-polarization.

As shown in FIGS. 3C and 3G, the even x-polarized mode of representation A2 shows a linking of the closest sidelobes across the y-axis. The even y-polarized mode of representation B2 exhibits some energy located within the solid membrane located at the mid-point. The combination of solid material at the mid-point with hollow regions on both sides forms a waveguide locally, and the even modes of the two-core PBF structure can concentrate a larger amount of energy in the solid membrane, thus raising their effective index. This observation explains the unique PBF feature of the even modes of the two-core PBF structure having a higher effective index than does the odd modes for odd values of the core-to-core spacing parameter d/Λ. For even values of the core-to-core spacing parameter d/Λ, the mid-point between both cores is located in a hollow region, and the differences between odd and even mode intensity profiles are much smaller.

Figure 7B:
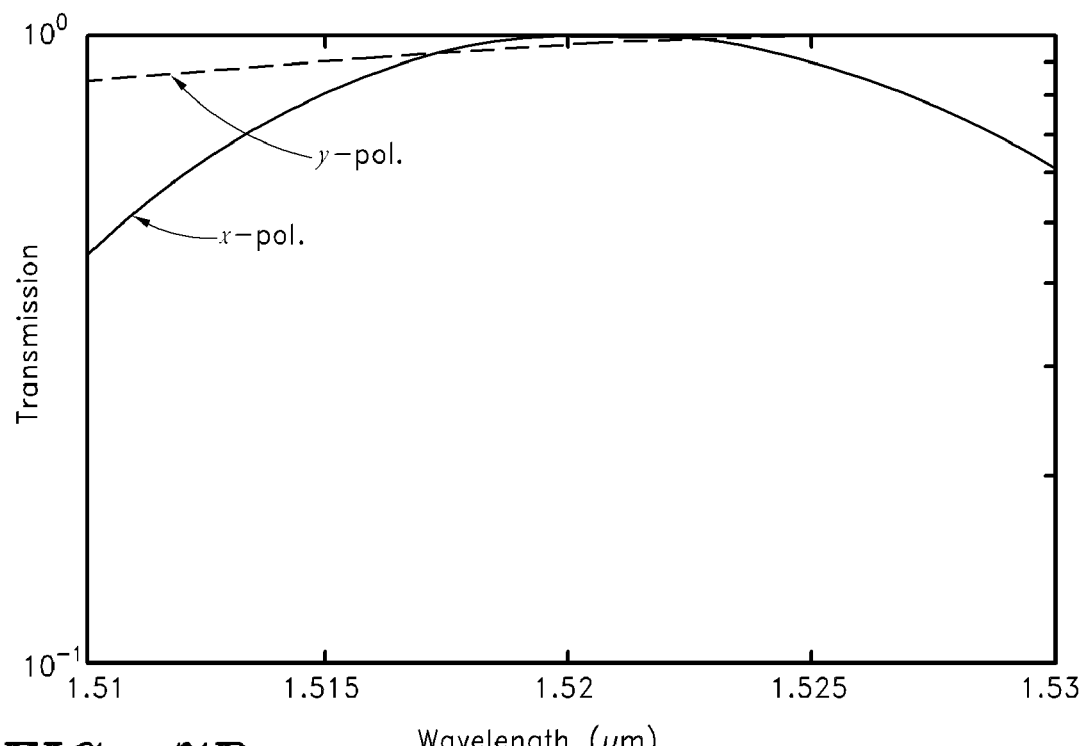
FIG. 7B illustrates the coupling ratios of FIG. 7A in the region of 1522 nanometers.

In certain embodiments, the two-core PBF can be used as a four-port fiber coupler 100, as schematically illustrated by FIG. 1A. The optical coupler 100 can be only a few millimeters in length and can provide full coupling between the ports. FIG. 7A illustrates the performance of an example optical coupler 100 by plotting the coupling ratio for a two-core PBF 150 with a crystal period Λ=2.6 microns, such that the bandgap is centered around 1.55 microns, with d=3Λ=7.8 microns and a length L=10.5 millimeters. The coupling ratio is plotted for both x- and y-polarized light. In certain embodiments having a sizable wavelength dependence, the optical coupler 100 can be used as a wavelength-division multiplexer with the same input polarization restrictions. The wavelength separation between 0 and 100% coupling ranges from about 18 nanometers to about 32 nanometers for the x-polarization, and from about 26 nanometers to about 42 nanometers for the y-polarization. To be useable over a broad range of wavelengths, in certain embodiments, the input polarization is advantageously maintained to be stable, for example by circuits using polarization-maintaining fiber.

In certain embodiments, the two-core PBF 150 can be used as a polarization-independent directional optical coupler at any of the wavelengths where the two curves of FIG. 7A intersect. For example, the two-core PBF 150 can be used as an approximately 3-dB fiber coupler at 1584 nanometers (point A of FIG. 7A), and an approximately 100% coupler at 1522 nanometers (point B of FIG. 7A). In the vicinity of point B, the coupling ratio exceeds 90% over a bandwidth of about 5 nanometers. Either the wavelengths or the coupling ratios at the crossing points can be adjusted to desired values by proper selection of the length of the two-core PBF 150.

Figure 7C:
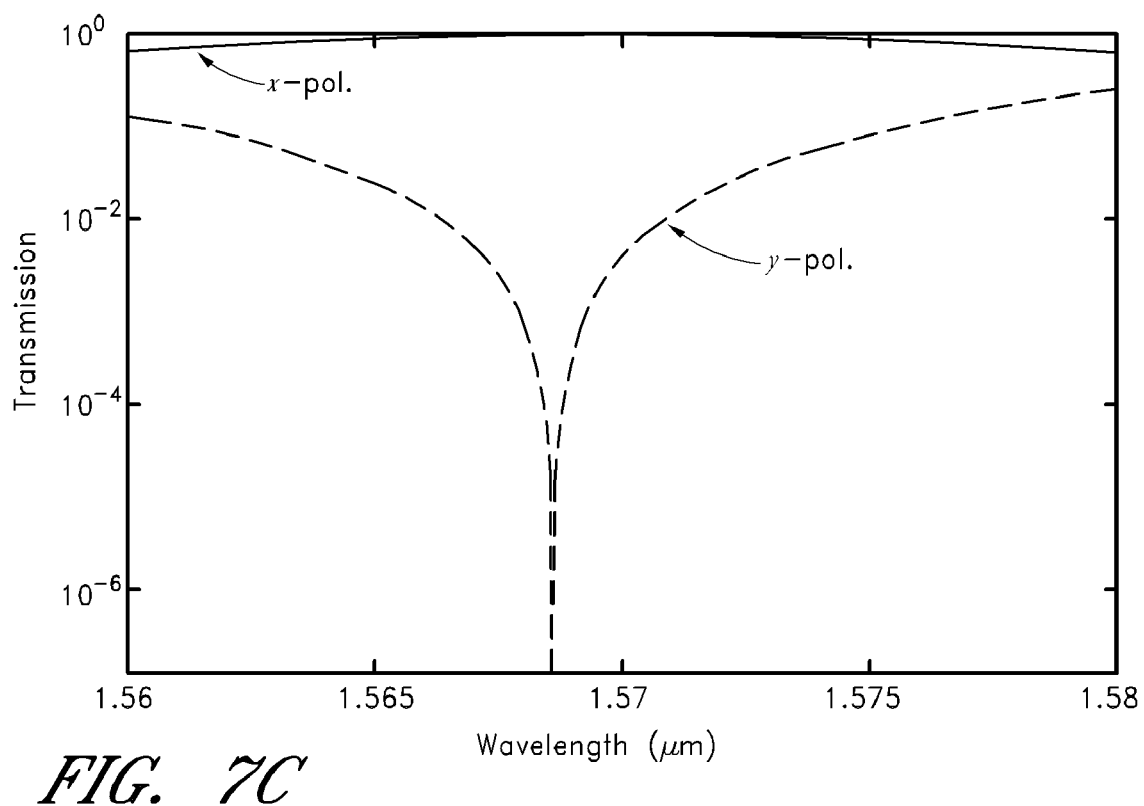
FIG. 7C illustrates the coupling ratios of FIG. 7A in the region of 1569 nanometers.
Figure 7D:
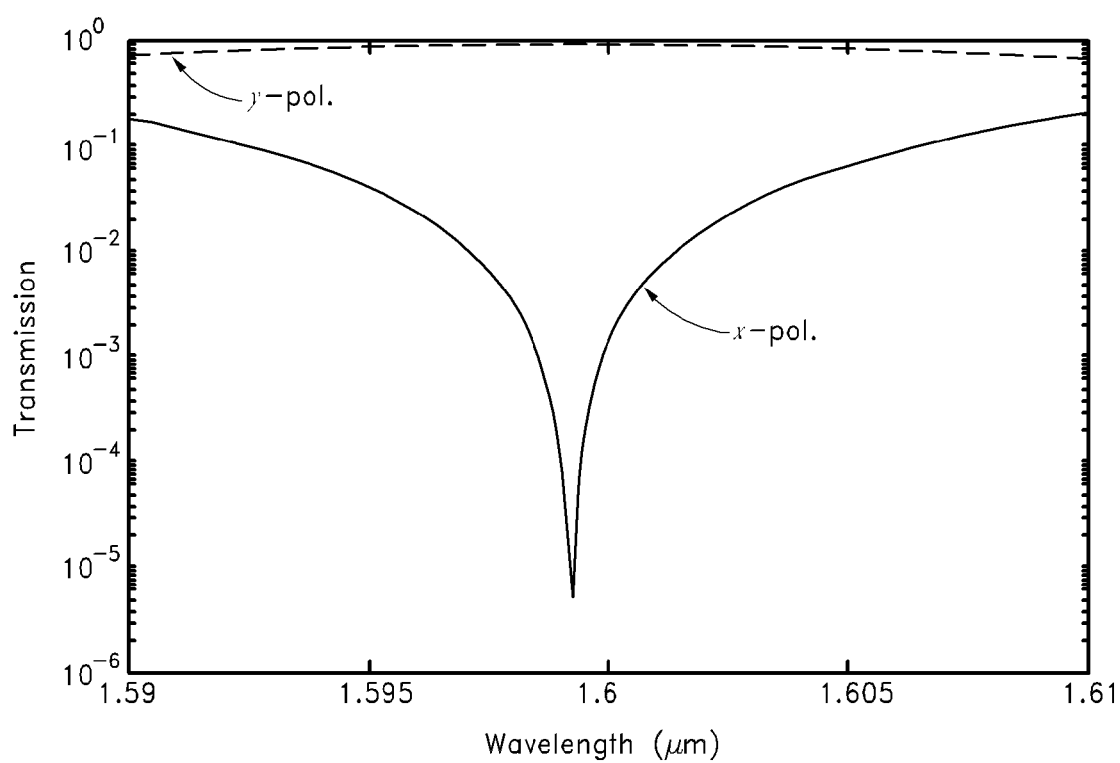
FIG. 7D illustrates the coupling ratios of FIG. 7A in the region of 1599 nanometers.

The polarization dependence of the two-core PBF 150 can also be exploited in certain embodiments to be used as either a fiber polarizer, a polarization splitter at discrete wavelengths, or a polarization sensor. Based on the curves of FIG. 7A, at 1569 nanometers (point C of FIG. 7A, magnified in FIG. 7C), x-polarized light comes out of one core or port and y-polarized light comes out of the other core or port. The 10-dB and 20-dB bandwidths are approximately 10 nanometers and 4 nanometers, respectively. Similar bandwidths are obtained at 1599 nanometers (point D of FIG. 7A, magnified in FIG. 7D), except that the roles of the polarizations are switched.

Figure 8A:
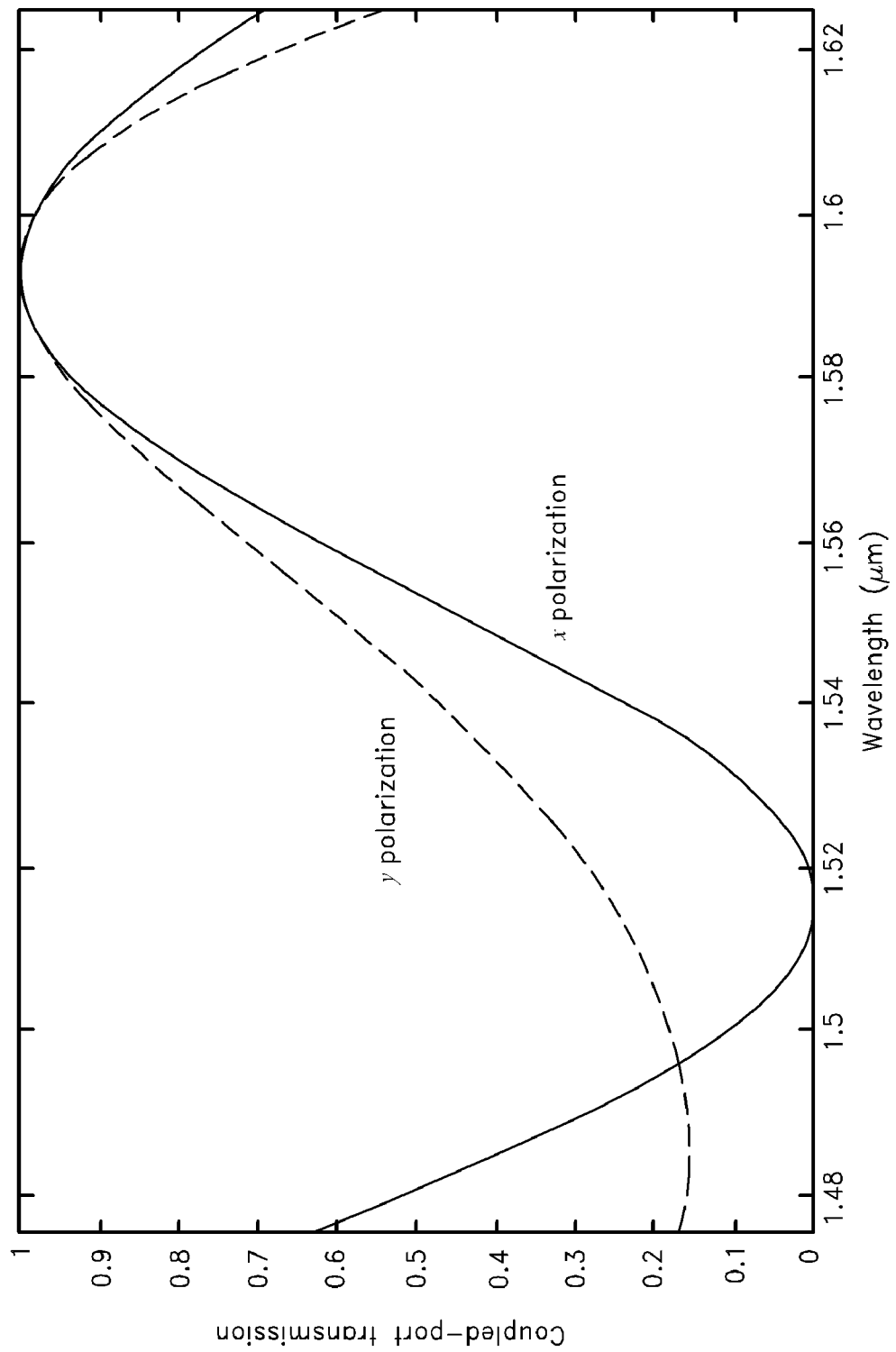
FIGS. 8A and 8B illustrate the transmission as a function of wavelength for both polarizations in example two-core PBFs with lengths of 2 millimeters and 3 millimeters, respectively.
Figure 8B:
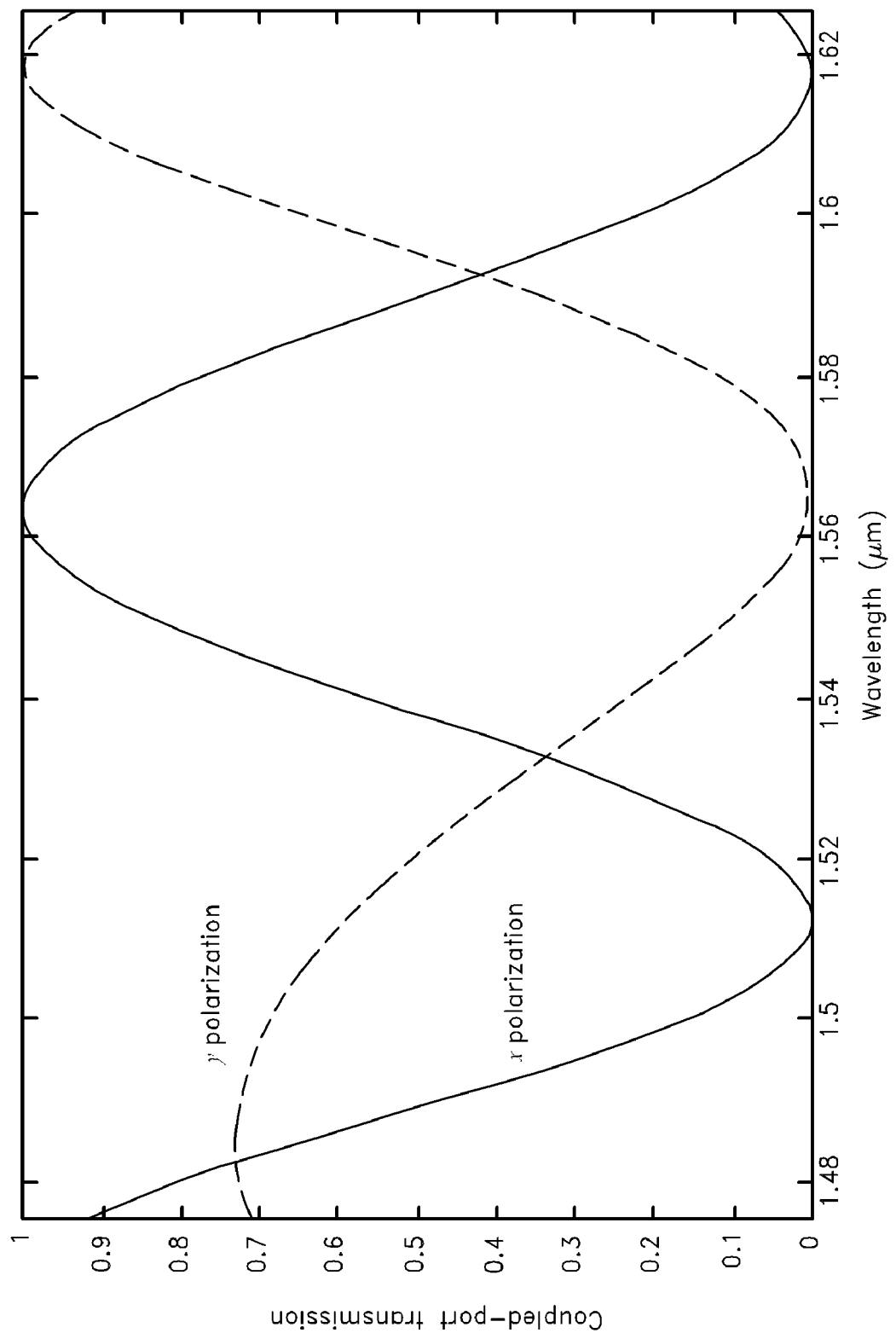

In certain embodiments, the center wavelengths can be adjusted by selecting the coupler length appropriately. FIGS. 8A and 8B illustrate the transmission as a function of wavelength for both polarizations in example two-core PBFs with lengths of 2 millimeters and 3 millimeters, respectively. Other geometrical parameters can also be adjusted to design a coupler with the desired coupling properties.

In certain embodiments, one or both of the cores has a thin ring of the first material (e.g., silica) surrounding the core. A calculation of the coupling length for a two-core PBF with a core ring of thickness t=0.025Λ showed a polarization-dependent change in coupling. For example, for d=3Λ, λ=0.6Λ, and Λ=2.5 microns, the coupling length for x-polarization decreased from 1.2 millimeters to 0.6 millimeters by adding the core ring, while the coupling length for y-polarization increased from 1.9 millimeters to 2.9 millimeters. This change may have originated from a modification in the mode field distribution towards the edge of the core when a ring is present, which modifies the overlap between the core modes and thus the coupling. Similarly, increasing the air-filling ratio of the fiber increases the coupling length. For example, for d=3Λ and at λ=1.5 microns at the center of the bandgap, when the cladding hollow region radius was increased from ρ=0.47Λ to ρ=0.49Λ (a typical value for commercial PBFs), the x-polarization coupling length increased from 1.2 millimeters to 2.7 millimeters and the y-polarization coupling length increased from 1.9 millimeters to 2.9 millimeters.

Figure 9:
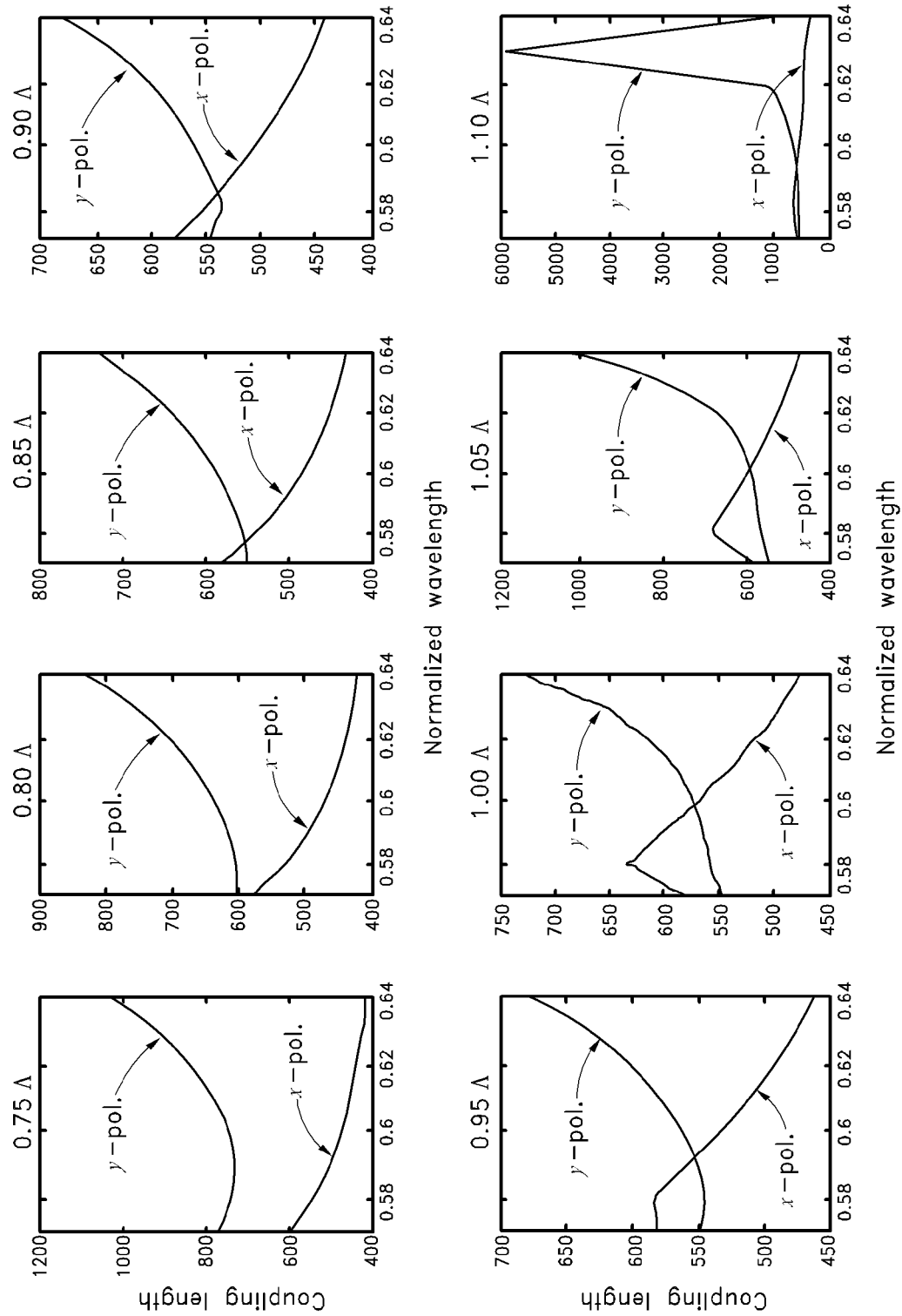
FIG. 9 illustrates the x- and y-polarization coupling lengths for various values of the core radius R as functions of wavelength.

In certain embodiments, the wavelength at which the x-polarization and y-polarization coupling lengths intersect (e.g., the wavelength at which the two-core PBF can be used as a polarization-independent directional coupler) can be selected by tailoring the core radius. This behavior is illustrated by FIG. 9 which shows the x- and y-polarization coupling lengths for various values of the core radius R as functions of wavelength. In certain embodiments in which the coupling length as a function of wavelength has an inflection point at which the slope is zero, the two-core PBF can be used as a broadband polarizer over a range of wavelengths.

Figure 10B:
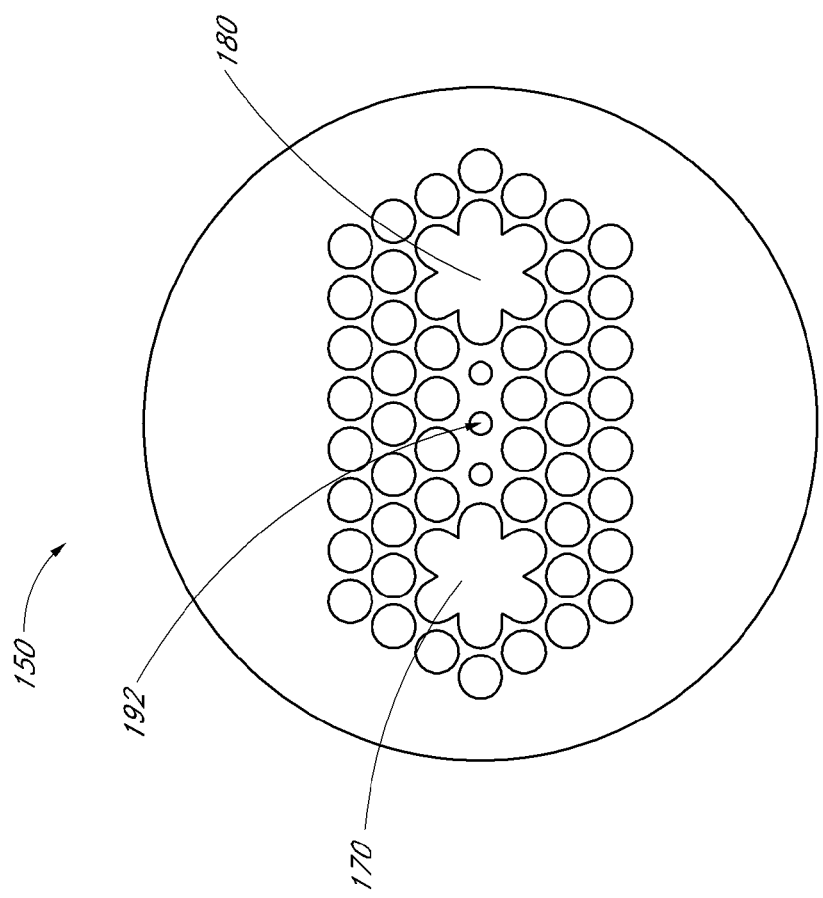
FIGS. 10A and 10B schematically illustrate two example two-core PBFs compatible with certain embodiments described herein.
Figure 10A:
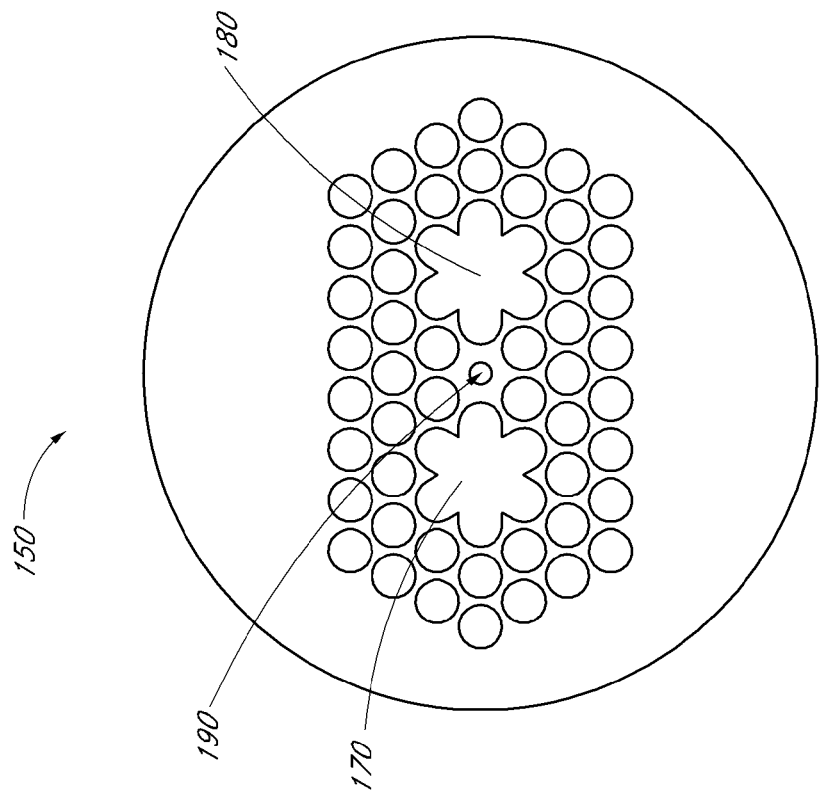

FIGS. 10A and 10B schematically illustrate two example two-core PBFs 150 compatible with certain embodiments described herein. Each of these structures can increase the coupling coefficient for larger core separations. FIG. 10A schematically illustrates a point defect 190 between the two cores 170, 180 and FIG. 10B schematically illustrates a line defect 192 between the two cores 170, 180. In certain embodiments, the propagation properties of the two-core PBF 150 are strongly affected by the structure of the defect between the two cores 170, 180.

Figure 11:
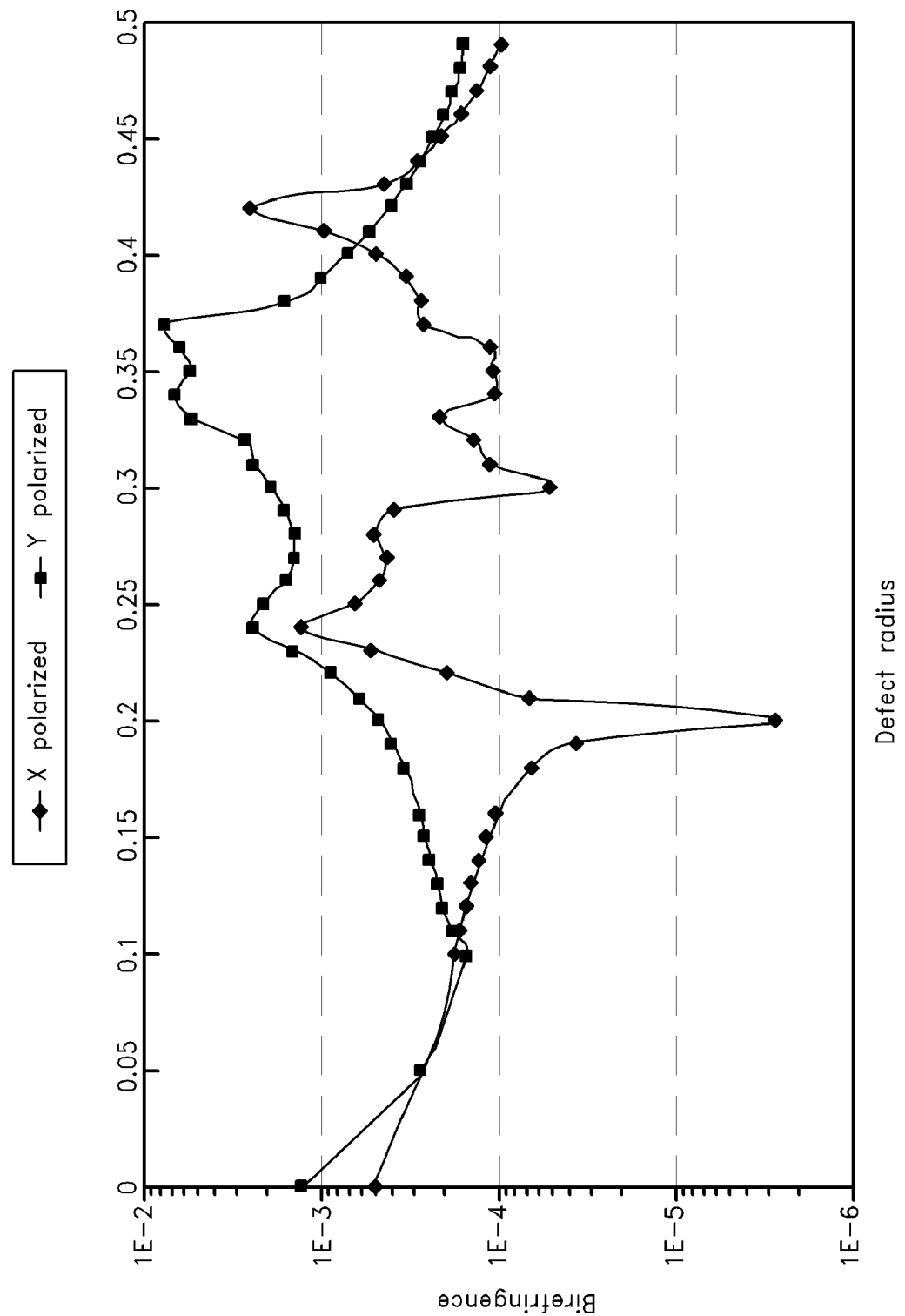
FIG. 11 illustrates the birefringence as a function of the defect radius for the point defect of FIG. 10A with a core separation of 4 crystal spatial periods.
Figure 12:
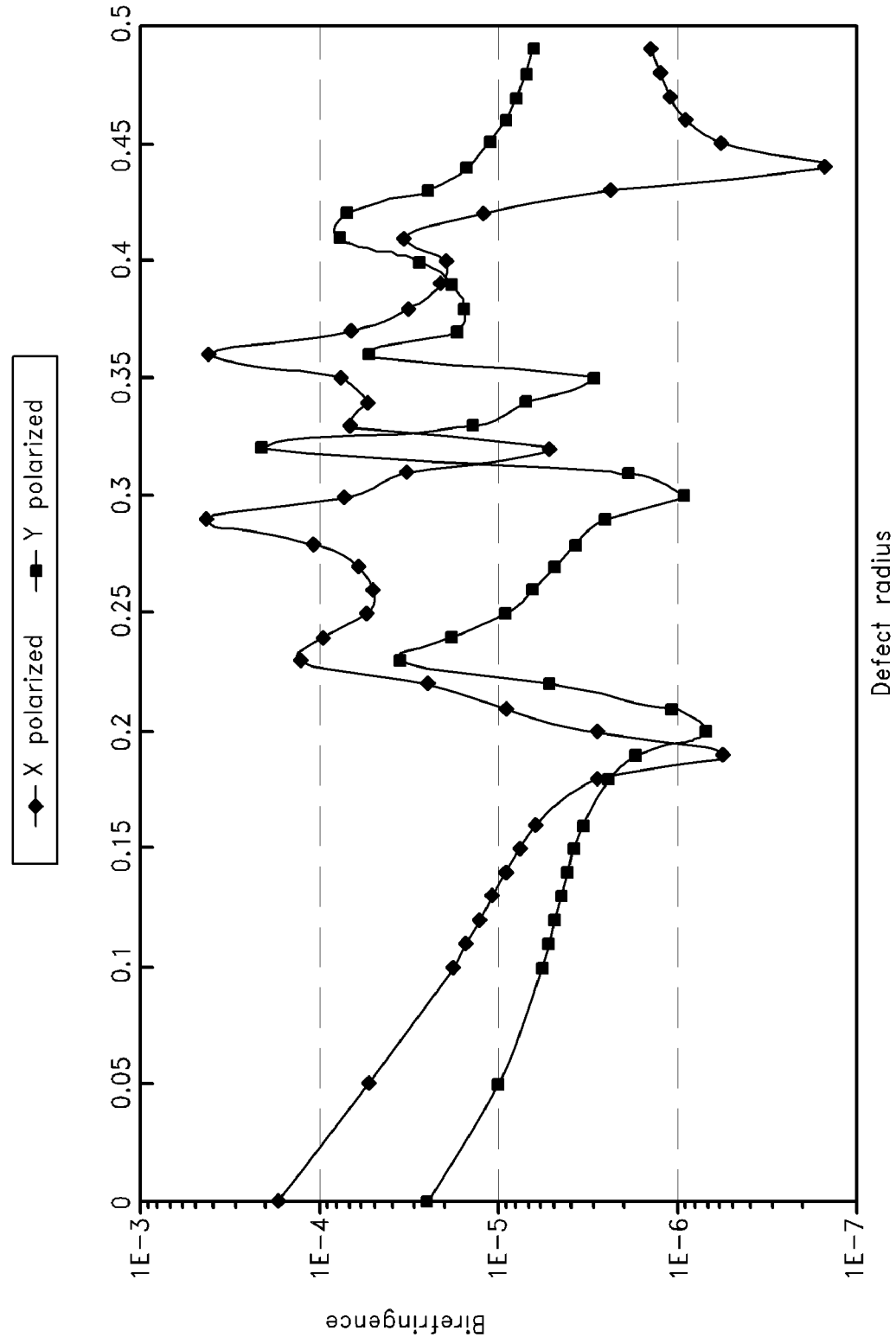
FIG. 12 illustrates the birefringence as a function of the defect radius for the point defect of FIG. 10A with a core separation of 6 crystal spatial periods.

FIG. 11 illustrates the birefringence as a function of the defect radius for the point defect 190 of FIG. 10A with a core separation of 4 crystal spatial periods. An increase of the coupling coefficient by about a factor of 20 is possible, and discontinuities due to interactions with surface modes are supported by the defect. FIG. 12 illustrates the birefringence as a function of the defect radius for the point defect 190 of FIG. 10A with a core separation of 6 crystal spatial periods. An increase of the coupling coefficient by about a factor of 10 is possible, and there is a high sensitivity to the defect radius when there are interactions with surface modes.

Figure 13:
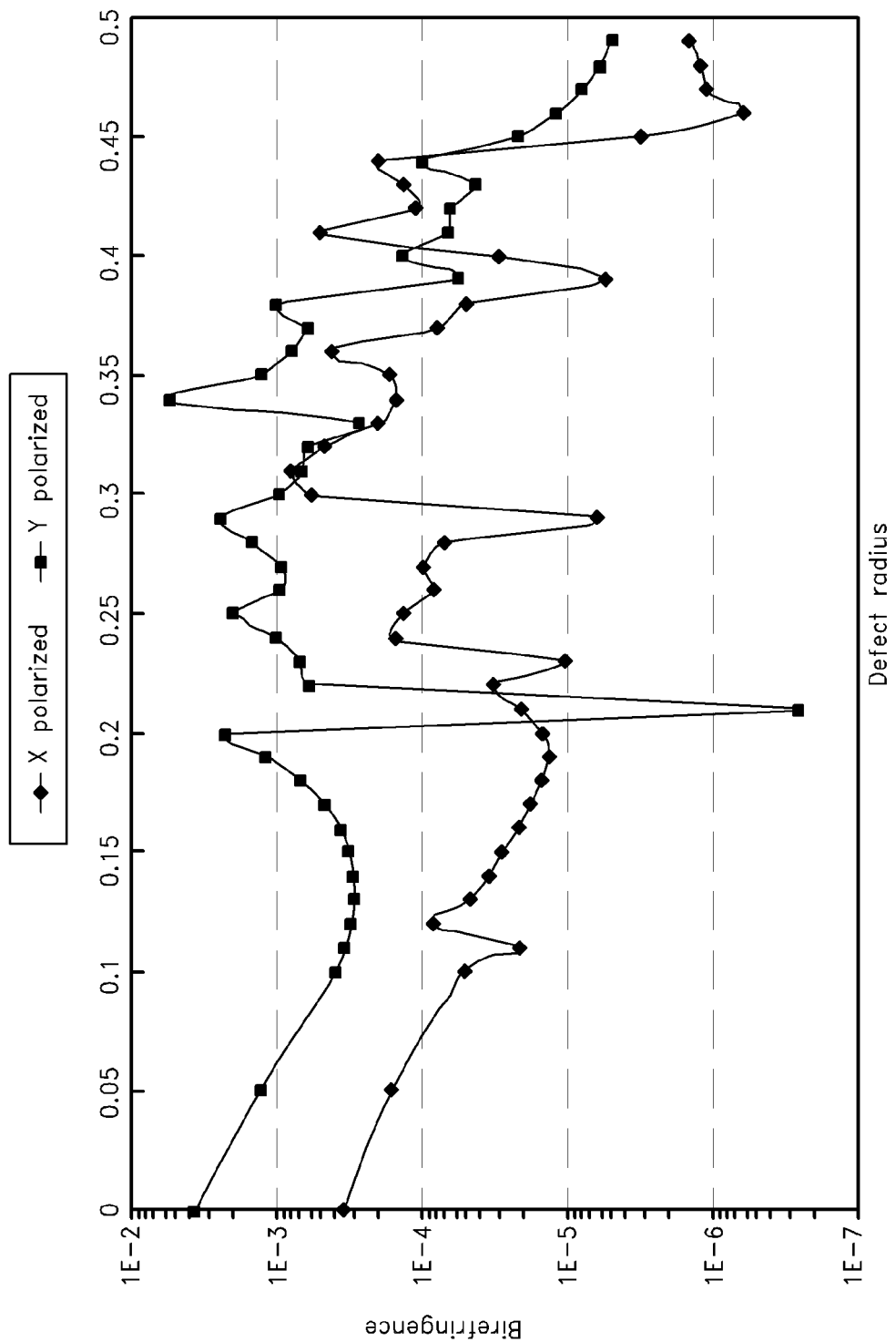
FIG. 13 illustrates the birefringence as a function of the defect radius for the line defect of FIG. 10B with a core separation of 6 crystal spatial periods.

FIG. 13 illustrates the birefringence as a function of the defect radius for the line defect 192 of FIG. 10B with a core separation of 6 crystal spatial periods. An increase of the coupling coefficient by about a factor of 1000 is possible, and there is a high sensitivity to the defect size in specific areas. In certain embodiments, the two-core PBF is operated at a wavelength at which the transmission is very strongly dependent on the defect size. The signal transmitted through the two-core PBF in certain such embodiments would exhibit a strong variation due to any perturbation of the defect size, and could serve as a sensor for any effects (e.g., pressure waves) that would perturb the defect size.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. An optical fiber comprising:
    a cladding;
    a first core;
    a second core, wherein at least a portion of the first core is generally parallel to and spaced from at least a portion of the second core such that the first core is optically coupled to the second core, wherein at least one of the first core and the second core is hollow and is substantially surrounded by the cladding; and
    a defect spaced from both the first core and the second core, the defect substantially surrounded by the cladding, the defect increasing a coupling coefficient between the first core and the second core.

2. The optical fiber of claim 1, wherein the cladding comprises a material with a first refractive index and regions within the cladding, the regions having a second refractive index lower than the first refractive index.

3. The optical fiber of claim 2, wherein the regions are hollow.

4. The optical fiber of claim 2, wherein the regions each have a respective center and adjacent regions are spaced apart in a periodic pattern having a spatial period.

5. The optical fiber of claim 4, wherein the first core and the second core have a center-to-center distance that is substantially equal to an integer multiple of the spatial period.

6. The optical fiber of claim 1, wherein the first core does not support surface modes and the second core does not support surface modes.

7. The optical fiber of claim 1, wherein the optical coupling between the first core and the second core is polarization-dependent.

8. The optical fiber of claim 1, wherein the first core and the second core have a coupling length in a range between approximately 1 millimeter and approximately 1.9 centimeters.

9. The optical fiber of claim 1, wherein the defect comprises a point defect on a central hole of the cladding.

10. The optical coupler of claim 1, wherein the defect comprises a linear defect.

11. A method for using an optical fiber, the method comprising:
    providing an optical fiber comprising:
        a first core;
        a second core spaced from the first core and optically coupled to the first core;
        a defect spaced from both the first core and the second core, the defect configured to increase a coupling coefficient between the first core and the second core; and
        a cladding substantially surrounding the defect and at least one of the first core and the second core; and
    coupling light between the first core and the second core.

12. The method of claim 11, further comprising using the optical fiber as a polarization-dependent optical coupler.

13. The method of claim 11, further comprising using the optical fiber as a polarization-independent optical coupler.

14. The method of claim 11, further comprising using the optical fiber as a wavelength-division multiplexer.

15. The method of claim 11, further comprising using the optical fiber as a fiber polarizer.

16. The method of claim 11, further comprising using the optical fiber as a polarization splitter.

17. The method of claim 11, wherein the at least one of the first core and the second core is hollow.

18. A photonic-bandgap fiber comprising:
    a first core;
    a second core optically coupled to the first core, wherein at least a portion of the second core is generally parallel to and spaced from at least a portion of the first core, wherein at least one of the first core and the second core is hollow;
    a defect spaced from both the first core and the second core, the defect increasing a coupling coefficient between the first core and the second core; and
    a cladding substantially surrounding the defect and the at least one of the first core and the second core.

19. The photonic-bandgap fiber of claim 18, wherein the first core does not support surface modes and the second core does not support surface modes.

20. The photonic-bandgap fiber of claim 18, wherein the optical coupling between the first core and the second core is polarization-dependent.

21. The photonic-bandgap fiber of claim 18, wherein both the first core and the second core are hollow.

22. The photonic-bandgap fiber of claim 18, wherein the defect comprises a point defect.

23. The photonic-bandgap fiber of claim 18, wherein the defect comprises a linear defect.

* * * * *

UNITED STATES PATENT AND TRADEMARK OFFICE
CERTIFICATE OF CORRECTION

PATENT NO. : 8,094,983 B2  
APPLICATION NO. : 12/941743  
DATED : January 10, 2012  
INVENTOR(S) : Dangui et al.

Page 1 of 1

It is certified that error appears in the above-identified patent and that said Letters Patent is hereby corrected as shown below:

On the title page (Item 54), and in column 1, line 2, Title, change "COUPLINGS" to --COUPLING--.

In column 3, line 7, change "$\rho=0.4\Lambda$," to --$\rho=0.47\Lambda$,--.

In column 8, line 38, change "$d=4\lambda$." to --$d=4\Lambda$.--.

Signed and Sealed this  
Twenty-seventh Day of November, 2012

David J. Kappos  
*Director of the United States Patent and Trademark Office*